United States Patent [19]
Hebert et al.

[11] Patent Number: 6,101,038
[45] Date of Patent: Aug. 8, 2000

[54] INFRARED AUDIO/VIDEO INTERFACE FOR HEAD-MOUNTED DISPLAY

[75] Inventors: Raymond T. Hebert; Kevin R. Hempson, both of Los Gatos, Calif.

[73] Assignee: Optimize, Incorporated, San Jose, Calif.

[21] Appl. No.: 09/305,092

[22] Filed: May 3, 1999

[51] Int. Cl.[7] .................................................. G02B 27/10
[52] U.S. Cl. .................... 359/618; 359/709; 359/717; 359/646; 359/630; 345/30; 345/59; 345/8
[58] Field of Search ................................. 359/618, 709, 359/717, 646, 793, 152, 189, 174, 630, 633; 345/30, 59, 87, 8

[56] References Cited

U.S. PATENT DOCUMENTS

| | | | |
|---|---|---|---|
| 3,674,925 | 7/1972 | Heckman, Jr. | 178/6.8 |
| 4,577,937 | 3/1986 | Clegg | 359/709 |
| 4,577,938 | 3/1986 | Clegg | 359/709 |
| 4,679,912 | 7/1987 | Loy | 359/646 |
| 5,005,213 | 4/1991 | Hanson et al. | 455/617 |
| 5,285,318 | 2/1994 | Gleckman | 359/709 |
| 5,438,366 | 8/1995 | Jackson et al. | 359/709 |
| 5,452,733 | 9/1995 | Sterman et al. | 128/898 |
| 5,612,710 | 3/1997 | Christensen et al. | 345/30 |
| 5,619,373 | 4/1997 | Meyerhofer et al. | 359/482 |
| 5,695,504 | 12/1997 | Gifford, III et al. | 606/153 |
| 5,818,419 | 10/1998 | Tajima et al. | 345/147 |
| 5,909,322 | 6/1999 | Bietry | 359/646 |
| 5,982,343 | 11/1999 | Iba et al. | 345/8 |

OTHER PUBLICATIONS

Heacock et al., "Viewing Ocular Tissues With A Stereoscopic Endoscope Coupled to a Head Mounted Display (HMD)," http://www.hitl, washington.edu/publications/heacock/, Feb. 17, 1998, 7 pages.

Jack, K., "Video Demystified, A Handbook for the Digital Engineer," Second Edition, published by HighText Interactive, Inc., San Diego, CA (1996), p. 67.

Inglis et al., "Satellite Technology, An Introduction," Second Edition, published by Focal Press, Boston, MA (1997), pp. 87–88, updated from "Satellite Technology, An Introduction," First Edition, published by Focal Press, Boston, MA (1991), pp. 66–67.

"Fiber Optic Transmission," Burr–Brown Corporation, Tucson, AZ, Application Bulletin AB–192 (1993).

"OmniBeam 2000 Laser Video Transceiver Series," Laser Communications, Inc., Lancaster, PA, Product Bulletin (1996).

"LACE™," Laser communications, Inc., Lancaster, PA, Product Bulletin (1996).

*Primary Examiner*—Loha Ben
*Attorney, Agent, or Firm*—Skjerven, Morrell, MacPherson, Franklin & Friel LLP; David E. Steuber

[57] ABSTRACT

A video interface linking a base station with a remote display, e.g., a head-mounted display, converts input video signals from NTSC or PAL formats into modulated video signals containing repetitive sequences of frame times with embedded audio and control signals. Each frame time includes equal consecutive color field times. Frame rates are converted by inserting selected repeating color frames into the datastream. Bursts of image information occupy a portion of each field time. During each data burst, the display is loaded with pixel luminance data. Between bursts, the display is illuminated by a color LED. Two video displays can be driven alternately, i.e., the first display loads while the second is illuminated. The modulated video signal can travel through the atmosphere on an infrared (IR) beam with a wavelength between 700 nm and 1100 nm. In one embodiment, the beam is scattered from a diffuse reflecting surface. Alternatively, the beam is shaped by a shaping lens. Designs for shaping lenses and collecting lens assemblies are described. Some embodiments include return audio transmission.

78 Claims, 20 Drawing Sheets

TRANSCEIVER BLOCK DIAGRAM

INFRARED AUDIO/VIDEO INTERFACE FOR HEAD-MOUNTED DISPLAY

CROSS REFERENCE TO RELATED APPLICATIONS

This application is related to Hebert, "Biocular Viewing System with Intermediate Image Planes for an Electronic Display Device", U.S. patent application Ser. No. 09/056,934, filed Apr. 6, 1998, commonly assigned, now U.S. Pat. No. 5,926,318 issued on Jul. 20, 1999, the specification of which is incorporated herein in its entirety.

FIELD OF THE INVENTION

This invention relates generally to image display systems and more particularly to infrared video and audio interfaces for head-mounted displays, principally eyeglass-mounted displays.

BACKGROUND

High quality medical remote imaging has gained increasing importance. This is particularly true of imaging during surgical procedures, most importantly minimally invasive procedures in which direct viewing of the surgical field is difficult. For example, a method for performing coronary artery bypass relies on viewing the cardiac region through a thoracoscope or other viewing scope (see for example Sterman et al. U.S. Pat. No. 5,452,733 and Gifford, III et al. U.S. Pat. No. 5,695,504). As a further example, a surgeon may perform a delicate vascular- or neuro-microsurgical reconstruction through a minimal incision under remote viewing. Remote imaging is now common in orthopedics, ophthalmology, urology, gynecology, anesthesiology, and other medical specifications.

In a conventional surgical environment, remote imaging is accomplished by attaching a video camera to an endoscope or other minimally invasive instrument and transmitting the video image via cable to a conventional CRT video monitor. This is often cumbersome in a crowded, brightly lighted operating room, where surgical team members are frequently moving around and the surgeon's view of the image screen is obstructed. Additionally, the CRT monitor is incapable of providing the surgeon with critical depth perception, since it is not stereographic.

Head-mounted displays (HMDs) potentially offer a method to overcome viewing obstructions typical in a surgical environment. While head-mounted displays have been designed, developed and deployed in military applications for many years, such displays are generally bulky, expensive, application-specific devices poorly suited to commercial or surgical applications. Additionally, users of head-mounted displays are frequently restricted in their range of motion by cumbersome interface cabling.

A compact HMD system requires a very small display device, such as those found in modern camcorder viewfinders, but with significantly higher resolution. A number of such devices are now becoming available, including transmissive and reflective liquid-crystal microdisplay devices and micro-mirror devices having resolutions at or in excess of VGA quality (640 pixels by 480 pixels) with pixel sizes on the order of 15 microns or less. However, they require integration into an ergonomic, well engineered and economical design. Most of these devices exhibit satisfactory image contrast only when illuminated and viewed at narrow angles of incidence, which compromises field of view, eye relief, and viewing comfort. Peripheral vision is also an important consideration.

A medical stereographic HMD system having dual display devices is described in Heacock et al. "Viewing Ocular Tissues with A Stereoscopic Endoscope Coupled to a Head Mounted Display (HMD)," http://www.hitl.washington.edu/publications/heacock/, Feb. 17, 1998. Kaiser Electro-Optics (2752 Loker Avenue West, Carlsbad, Calif. 92008 manufactures the "CardioView," "Series 8000," and "StereoSite" HMD display systems for Vista Medical Technologies. These systems are bulky, heavy, and expensive, and require two LCD display devices. For peripheral vision correction they require the user to wear the HMD over conventional corrective eyeglasses, aggravating user inconvenience and discomfort. Meyerhofer et al. U.S. Pat. No. 5,619,373, issued Apr. 8, 1997, describes a single display device involving beamsplitters for non-stereographic, biocular viewing.

The scan formats of video source devices, e.g., cameras and cassette players, are not directly compatible with typical solid state display devices. In particular, frame rates conforming with NTSC or PAL standards are too slow, and produce undesirable perceived flicker in solid state displays, which do not have the luminous persistence of phosphor screen displays, for example conventional TV displays. Therefore scan format and frame rate conversion are needed.

Heckman, U.S. Pat. No. 3,674,925, describes a wireless interface between a video camera source and a remote viewing display, employing a modulated optical video signal transmitter which doubles as a target illuminator. Hanson et al., U.S. Pat. No. 5,005,213, describes a wireless infrared/optical video interface directed to military applications. Puar et al., U.S. Pat. No. 5,650,955 describes an infrared interface for generating video images on a LCD or CRT display. However, the above cited U.S. Patents do not address, among other things, serial multiplexed color data, frame rate or scan format conversion.

Therefore, what is needed in the art is a compact, high resolution, high contrast microdisplay system, particularly for surgical viewing, that is suitable for head-mounted display use without requiring undue complexity or expense and that preferably supports biocular and/or truly stereographic viewing. The system should incorporate format and frame rate conversion to provide compatibility between solid state display devices and conventional video input sources. The system should provide good color fidelity and should incorporate ergonomic design for comfort and efficiency, including peripheral vision accommodation and minimal cabling.

SUMMARY

Apparatus according to the present invention includes a video or audio/video interface linking a base station with a remote video display. Video processing circuitry at the base station converts an input color video signal conforming to NTSC (525 lines) or PAL (625 lines) formats from a conventional source, e.g., a video camera, into a modulated video signal having a format appropriate to drive a solid state video display, e.g., a LCD display. The modulated video signal has a data structure containing a repetitive sequence of uniform frame times. Each frame time consists of substantially equal consecutive field times for each of three component color fields. Image information for each color field is encoded as a burst of pixel luminance data occupying roughly one-half of each field time. The data structure also typically contains embedded scan and frame control signals and an audio channel subcarrier. To minimize flicker, a frame rate of the order of 80 frames per second is required. This in turn requires a field time of roughly 4 msec. To handle this video data throughput typically requires a bandwidth of at least 100 MHz.

To achieve the required frame rate, conversion is needed from conventional frame rates of 60 Hz or 50 Hz from input sources conforming to NTSC and PAL formats respectively. This is done by inserting selected repeating color fields into the modulated video signal datastream.

The modulated video signal is transmitted to a remote receiver, located adjacent to a remote video display. The remote video display can be a mobile display, for example mounted in a headset worn by a user. A remote circuit interconnected between the receiver and the display demodulates the modulated video signal and controls the image data loading and color illumination of the display device. During each burst of data, the display device is loaded with pixel luminance data for a single color field. During the period between the end of one data burst and the onset of a subsequent burst, the display device is illuminated by a color LED corresponding to the color field just loaded. The process is repeated sequentially for the three color fields of the image frame, such that bursts of pixel luminance data alternate synchronously with illumination by an appropriate LED.

In some embodiments, two separate video display devices (e.g., for stereographic viewing) can be driven alternately. Each display is illuminated while the other display is loaded with video data. The two alternating burst datastreams are derived from a single time-multiplexed modulated video signal.

Although the video interface can transmit the modulated video signal through a conductive coaxial cable from the base station to the remote receiver, cables are cumbersome for mobile receivers, for example head-mounted displays, where they restrict the motion of a user. Alternatively, the video interface can transmit the modulated video signal on a modulated beam of infrared or other electromagnetic energy. Particularly, an infrared (IR) wavelength can be selected outside the visible region in the range of approximately 700 nm to approximately 1100 nm, where good conventional photodetectors, LEDs, and laser diodes are available. The IR beam can be guided through an optical fiber connecting the base station with the remote receiver, but this method has the same drawbacks as the coaxial cable.

Alternatively, the IR beam carrying the modulated video signal can be generated by a laser diode or LED cluster and then shaped or projected by lenses and transmitted through a free atmospheric path. In one embodiment, the IR beam is projected onto a diffuse reflecting surface (for example the ceiling or a panel adjacent to the ceiling) by a conventional projection lens connected to the base station. The scattering surface is positioned and oriented such that the scattered IR signal is concentrated in a volume including the probable location of a remote receiver. Alternatively, the IR beam is projected through a shaping lens. The shaping lens projector is interconnected with the base station through an optical fiber or coaxial cable tether, and is located and oriented such that its shaped IR output pattern is concentrated in a volume including the probable location of a remote receiver.

In one embodiment, a shaping lens assembly includes a convergent output lens with a hollow conic input surface and a substantially hemispheric output surface. A divergent input lens has a hollow conic input surface and a flat output surface. The two elements are aligned and adjustably spaced along a mutual cone axis. In an alternative shaping lens assembly, a single-element shaping lens with a hollow input surface and a substantially hemispheric output surface is combined with a cluster of IR LEDs. The shaping lens is aligned and adjustable relative to the LED cluster along a mutual axis. These configurations produce a nonuniform output pattern that concentrates the IR beam efficiently in, for example, a surgical environment.

In one embodiment, the receiver includes a collecting lens assembly incorporating a photodetector. The photodetector is optically cemented onto an end of an inner light cone having diffusely reflecting outer walls to recapture signal energy that would otherwise be reflected out of the system. Attached coaxially to a second end of the inner light cone is a wide-angle collecting lens. Coaxially surrounding the wide-angle collecting lens is an outer conic cavity with polished reflective inner walls which increases the effective aperture of the collecting assembly. An optional optical bandpass filter is positioned over the assembly.

In some embodiments, one or more optical elements of the shaping lens assembly and/or the collecting lens assembly are aspheric. Transmissive optical elements are typically made from transparent polymeric material, for example polymethyl methacrylate, polycarbonate, and ULTEM®.

In some embodiments, the interface includes a return audio link that provides return audio communication from the receiver location to the base station. The return audio can modulate a LED, which emits an audio modulated IR signal through the atmosphere. The audio modulated IR signal is then detected by a separate receiver connected to the base station, where the audio data is processed and restored.

The present invention is better understood upon consideration of the detailed description below, in conjunction with the accompanying drawings.

BRIEF DESCRIPTION OF THE DRAWINGS

The present invention may be better understood, and its numerous objects, features, and advantages made apparent to those skilled in the art by referencing the accompanying drawings. For simplicity and ease of understanding, common numbering of elements within the illustrations is employed where an element is the same in different drawings.

DETAILED DESCRIPTION OF THE EMBODIMENTS

The following is a detailed description of illustrative embodiments of the present invention. As these embodiments of the present invention are described with reference to the aforementioned drawings, various modifications or adaptations of the methods and or specific structures described may become apparent. These descriptions and drawings are not to be considered in a limiting sense as it is understood that the present invention is in no way limited to the embodiments illustrated.

Figure 1A:
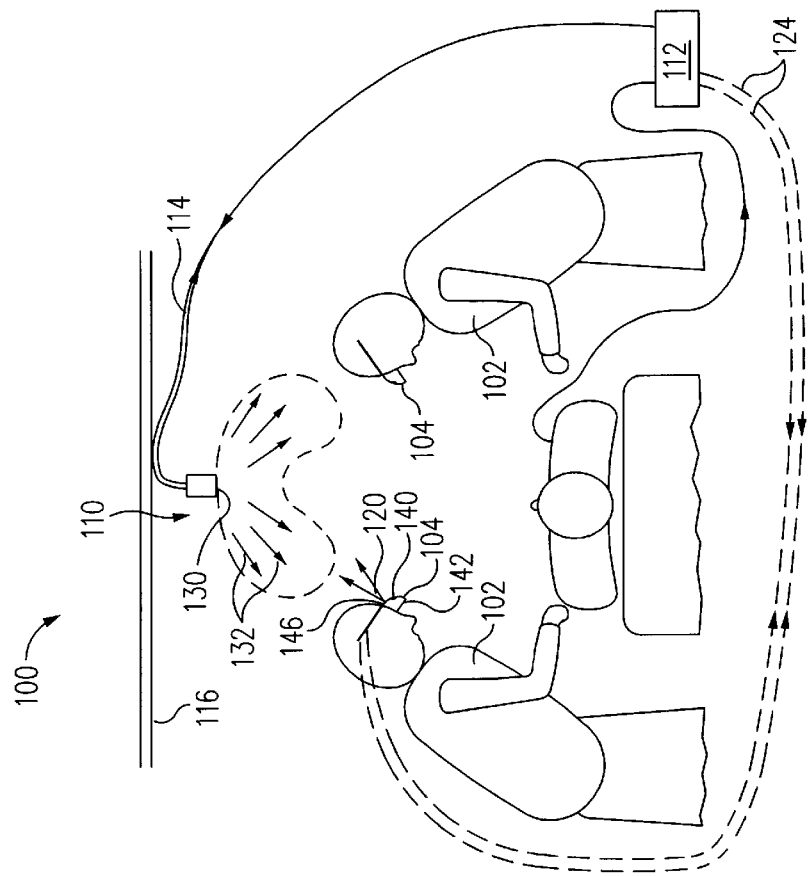
FIG. 1A is a schematic view of a surgical environment including an infrared video interface for a head-mounted display, in accordance with the present invention.

FIG. 1A is a schematic view of a surgical environment including an infrared video interface 100 for a head-mounted display, in accordance with the present invention. A user 102, e.g., a surgeon or assistant, wears a headset 104, containing a remote video display device 140 and a remote electronic circuit 142, including ancillary optical, audio, and electronic apparatus, described in more detail below. In some embodiments, all of the receiving, processing, audio, and display functions relating to the head-mounted display are performed within headset 104.

Alternatively, some of these functions are performed within an optional utility module 105a attached, for example, to the clothing or belt of user 102, and connected to headset 104 by a utility cable 105b. Batteries 144 configured to power the respective head-mounted display functions can be mounted at headset 104 or optionally at utility module 105a. A remote mobile video bandwidth receiver 146 located, e.g., at headset 104, receives a diffusely reflected infrared signal 118 carrying video and/or audio data on a modulated beam of electromagnetic energy. A modulated infrared signal 106 is transmitted through the atmosphere from a projection lens 108 mounted to a transceiver module 110, which is connected to a base station 112 by a tether 114. Projection lens 108 is typically a conventional converging optical element, e.g., a convex lens. Alternatively, transceiver module 110 is integral with base station 112.

In the embodiment of FIG. 1A, projection lens 108 projects modulated IR signal 106 through the atmosphere onto a diffusely reflective target area of the ceiling 116 or (not shown) mounted adjacent ceiling 116. Infrared signal 106 is scattered through the atmosphere from the diffuse target area as diffusely reflected IR signal 118, a portion of which illuminates headset 104. In some embodiments, the diffuse target area (e.g., ceiling 116), provides a substantially cosine (Lambertian) pattern of diffusely reflected IR signal 118. Alternatively, the diffuse target area has a lenticular or other well known surface structure, providing a directionally preferred scattering pattern of scattered infrared signal 118.

In some embodiments, headset 104 provides a return audio signal back to base station 112. A return IR beam 120 carries the modulated audio signal at least in part through an atmospheric transmission path, generally retracing the transmission paths of diffusely reflected IR signal 118 and projected infrared signal 106.

Although a surgical environment is depicted in FIG. 1A, in other embodiments similar configurations including an infrared video interface 100 for a head-mounted display, in accordance with the present invention, are applied to a variety of environments.

Figure 1B:
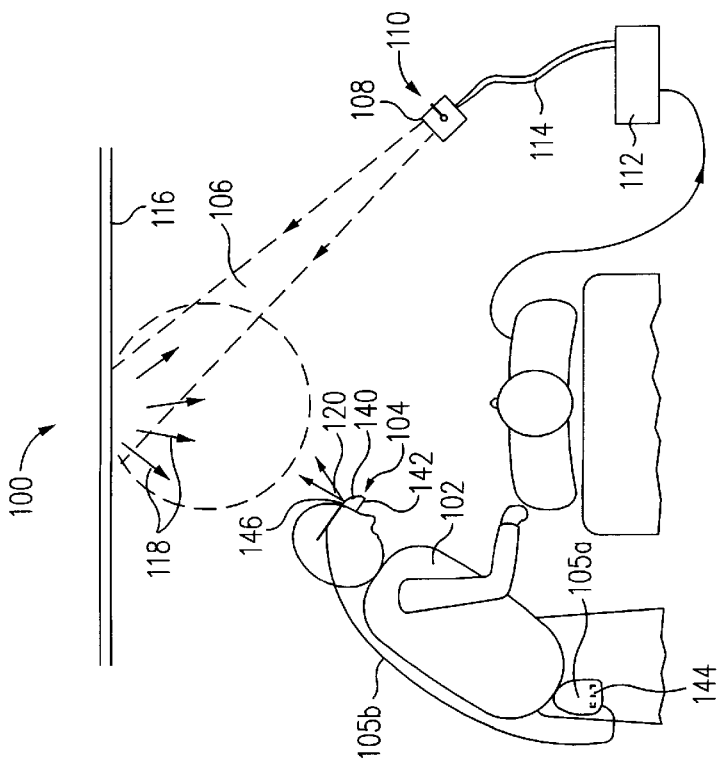
FIG. 1B is a schematic view of an alternative surgical environment to that of FIG. 1A.

FIG. 1B is a schematic view of an alternative surgical environment to that of FIG. 1A. Transceiver module 110 is attached above the working space of users 102, e.g., suspended from ceiling 116 or other elevated support, and is connected with base station 112 by tether 114. A shaping lens assembly 130, described in more detail below, is mounted in transceiver module 110 and is configured to project a shaped infrared beam 132 having a nonuniform pattern, that concentrates shaped IR beam 132 within the volume including the probable location of respective users 102. The nonuniform pattern of shaped IR beam 132 of FIG. 1B provides greater transmission efficiency and signal to noise ratio (S/N) than the configuration of FIG. 1A, since transmission loss at a diffusely reflecting surface is eliminated.

Many of the properties of infrared video interface 100, in accordance with the present invention, derive from the requirements of head-mounted video display 140. For some embodiments, these requirements are described in Hebert, U.S. patent application Ser. No. 09/056,934, cited above. In some embodiments, headset 104 does not require a frame memory.

To simulate full color using a monochromatic display, as described in Hebert, cited above, the display device is sequentially illuminated with red, green, and blue light sources, for example LEDs. When this sequential illumination occurs at a high enough frequency, a user's eye merges the sequence of colors and creates a perception of full color. In accordance with the present invention, infrared video interface 100 carries each sequential field of red, green, or blue video information as a burst of data. The sequence is repeated at a data rate, such that full motion and full color images are simulated.

A solid state display is preferably illuminated at approximately an 80 Hz frame rate (a 240 Hz field rate representing a three-color sequence for each frame) to minimize the amount of flicker perceived by the eye. This is equivalent to one color field each 4.16 msec. However, the NTSC (National Television Standards Committee) video format provides a 60 Hz frame rate, whereas PAL (Phase Alternating Line) video format provides a 50 Hz frame rate. Both of these frame rates are too slow to prevent perceived flicker in the solid state display. Because of luminous persistence of phosphors, conventional video displays, e.g. TV screens, are more tolerant of the slower frame rates. Therefore, frame rate conversion is performed in base station 112. In accordance with embodiments of the present invention, the method adopted to increase the effective frame rate is cyclical repetition of one or two of the sequential red, green, or blue fields. The specific scheme applied depends on whether the input source conforms with an NTSC or PAL format. For further discussion of conventional video standards and sources, see for example K. Jack, "Video Demystified, A Handbook for the Digital Engineer," Second Edition, 1996, published by HighText Interactive, Inc., San Diego.

From an NTSC source, interlaced color frames are received at a rate of 60 Hz, (or 16.66 msec per frame). If RGB indicates a new input three-color field sequence (red, green, blue), and if rgb indicates repeated color fields (red, green, blue), then the following sequence can be generated: RGBrGBRgBRGb RGBrGBRgBRGb. The insertion of one repeated output color field for each consecutive set of three input color fields increases the perceived frame rate and thereby reduces perceived flicker. The repeated color selection and the consecutive input color field set are rotated cyclically, thereby preserving the original color sequence and retaining color fidelity. By converting to four separate color fields every 16.66 msec, then each individual color field is sent every 16.66/4=4.16 msec, resulting in 240 individual color fields transmitted per second. The effective three-color frame output rate is 240/3=80 "full color" frames per second.

From a PAL source, interlaced color frames are received at a rate of 50 Hz (or 20.0 msec per frame). If RGB indicates a new input three-color field sequence (red, green, blue), and rgb indicates repeated color fields (red, green, blue), then the following sequence can be generated: RGBrgBRGbrGBRgb RGBrgBRGbrGBRgb.

The insertion of two repeated output color fields for each consecutive set of three input color fields increases the perceived frame rate and thereby reduces perceived flicker. The repeated color selections and the consecutive input color field set are rotated cyclically, thereby preserving the original color sequence and retaining color fidelity. By converting to five separate color fields every 20 msec, then each individual color field is sent every 20.0/5=4.0 msec, resulting in 250 individual color fields transmitted per second. The effective three-color frame output rate is 250/3=83.3 "full color" frames per second.

The total available field time (either 4.16 msec for NTSC or 4.0 msec for PAL) is partitioned into several phases, including: (1) erase display, (2) load display, and (3) illuminate display with an appropriate red, green, or blue LED. In the present embodiment, the display loading time is selected to be approximately 2 msec for each color field of information. During this 2 msec interval, each of the 800× 600 pixels in the display is loaded with luminance data, namely, some gradation between black and white. Thus, all 480,000 of the pixels must be loaded in 2 msec or less. This corresponds to a throughput of 480,000 pixels/2 msec=240 million pixels per second. Thus, during 2 msec of each color field time, infrared video interface 100 transmits the equivalent of 240 million pixels per second, roughly a pixel every 4 nsec.

Since the signal is encoded using a baseband (no carrier frequency) amplitude modulation (AM) protocol, the IR interface data transport scheme can be described as "burst mode amplitude modulation". Amplitude modulation is preferred to simplify the receiver design. The encoding scheme can alternatively utilize pulse modulation without changing the fundamental structure of IR video interface 100. However, receiver circuits would need to convert the pulse modulation back into amplitude modulation to be compatible with a display of the present embodiment.

Figure 1C:
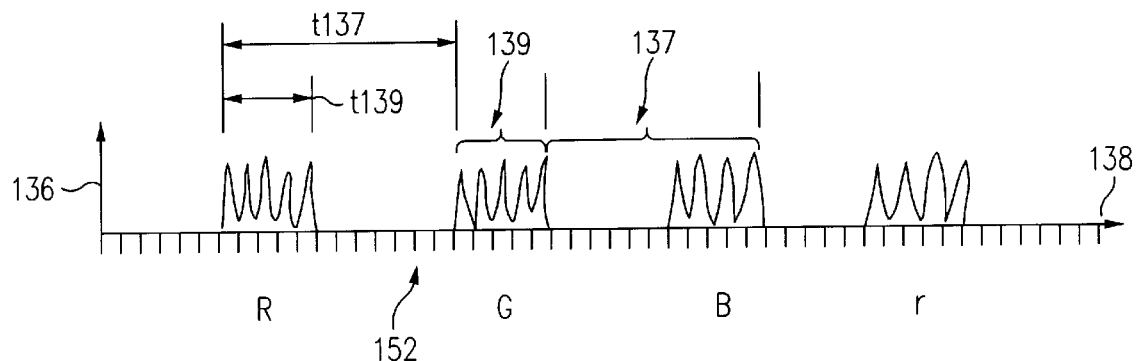
FIG. 1C is a graphic representation of a typical burst mode data structure for a solid state video display, in accordance with an embodiment of the present invention.

FIG. 1C is a graphic representation of a typical burst mode data structure for a solid state video display, in accordance with an embodiment of the present invention. In FIG. 1C, signal amplitude 136 is shown as a function of time 138. Sequential input color fields are labeled R, G, and B, followed by a repeated color field labeled r. A repetitive sequence of horizontal sync pulses 152 provides basic synchronization for the burst mode structure. An individual color field 137 has a time duration t137, or approximately 4 msec. The pixel luminance data 139 within each color field is transmitted as a data burst and has a time duration t139, or approximately 2 msec.

Figure 1D:
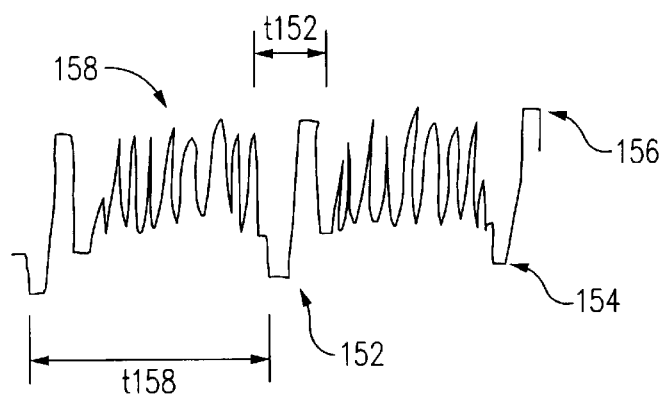
FIG. 1D is graphic representation of a typical horizontal line within the data burst structure of FIG. 1C, illustrated on an expanded time scale.

FIG. 1D is graphic representation of a typical horizontal line within data burst 139 of FIG. 1C, illustrated on an expanded time scale. Within each color field burst R, G, B, r of FIG. 1C is a series of horizontal sync pulses 152. A typical horizontal sync pulse 152 has a substantially rectangular waveform with an amplitude that defines a grey scale between black 154 and white 156. Between consecutive horizontal sync pulses 152 is one horizontal line of analog pixel data 158, e.g. 800 pixels to a horizontal line. The full width t152 of a horizontal sync pulse 152 provides a clock basis for data burst timing and has a duration typically equal to that of 32 pixels, which corresponds to approximately 125 nsec. The time duration t158 between consecutive horizontal sync pulses is approximately 3.25 μsec in the example shown.

The design of IR video interface 100 is adaptable for driving one or two displays. In the single display mode, half of each color field time is used for data transfer, and the other half is used for illumination. In the dual display mode, one half of each color field time is used for data transfer to a first display, and the other half of the time is used for data transfer to the second display. First and second displays are alternately illuminated, such that the illumination occurs for one display while data is transferred to the other display, as described below in more detail.

If IR video interface 100 is required to transmit data for two display channels, then each channel can be alternately loaded and illuminated. Thus the interface carries burst mode image data for a first channel during 2 msec, while a second channel is illuminated. Likewise, during the next approximately 2 msec interval, the first channel is illuminated while the interface transmits image data to the second channel. This scheme can be described as time division multiplexing (or time-duplexing) with burst mode modulation.

In an imaging system, bandwidth manifests itself as the ability to resolve fine spatial details, such as the sharp edges of objects. More specifically, the measured bandwidth of a high quality endoscopy video camera is approximately 5.33 MHz for each individual RGB channel. An example of such a video camera is the Telecam SL NTSC, sold by Karl Storz Endoscopy, 91 Carpenter Hill Road, Charlton, Mass. 01507. The Storz camera bandwidth represents approximately 275 horizontal cycles (black-white transitions). This is based on a 60 Hz (525 line) system using a standard 52 μsec horizontal line time, i.e. (5.33 MHz/52 μsec) approximately 275 cycles per line. The IR video bandwidth required to deliver 275 cycles in one display line time, namely t158 seconds as shown in FIG. 1D, is about 85 MHz, i.e. (275 cycles/3.25 μsec). Bandwidth calculations for more cycles (higher resolutions) yield about 100 MHz for VGA (320 horizontal cycles) or 125 MHz for SVGA (400 horizontal cycles). In light of these considerations, the infrared interface must support a bandwidth of about 85 MHz to display high quality images from traditional NTSC or PAL sources, and greater than 100 MHz for VGA or SVGA computer generated images.

Conventional bandwidths for audio communication channels are only of the order of 20 KHz. Therefore, an audio channel can easily be added or embedded as a subcarrier in a video channel having bandwidth of the order of 100 MHz. In the discussion below, a video interface, channel, or signal is generally assumed to include dual audio/video capability.

Transmitting sequential color fields across IR video interface 100 increases the bandwidth requirement, but reduces the complexity of receiver and color decoder circuits, described below in more detail. Additionally, repeating selected color fields in the sequence enables an increase in the rate of updating a display frame, thereby reducing perceived flicker.

In addition to bandwidth (image resolution), signals transmitted over an interface must have a high signal to noise ratio (S/N) to provide acceptable image quality. S/N ratios are conventionally measured in decibels (dB), which are logarithmic units. For example, a 40 dB S/N ratio represents one part of noise in 100 parts of signal, i.e., one percent noise. This S/N ratio equates to the EIA standard for "fine quality" broadcast television, which is seen under nearly ideal reception conditions. For a detailed discussion, see for example Table 16 and related text of "Satellite Technology, An Introduction," by Andrew F. Inglis, 1991, published by Focal Press. In accordance with the present invention, IR video interface 100 is designed to meet a higher S/N standard than 40 dB.

The high bandwidth and signal to noise requirements discussed above require that the IR composite video and audio transmitter and return audio receiver (e.g., transceiver module 110) be located in a position where the IR energy is efficiently directed toward the area of the receiver, namely headset 104. FIG. 1B illustrates transceiver module 110 positioned above users 102 and connected to base station 112 by tether 114. As shown in FIG. 1B, the pattern of IR signal 132 from transceiver module 110 is shaped by shaping lens assembly 130, described below in more detail. In FIG. 1A, transceiver module 110 is located closer to base station 112, and infrared signal 106 is collimated by projection lens 108 and aimed at a diffuse surface above users 102. This configuration is less efficient than that of FIG. 1B, since IR signal 106 undergoes an extra diffuse reflection.

Figure 2A:
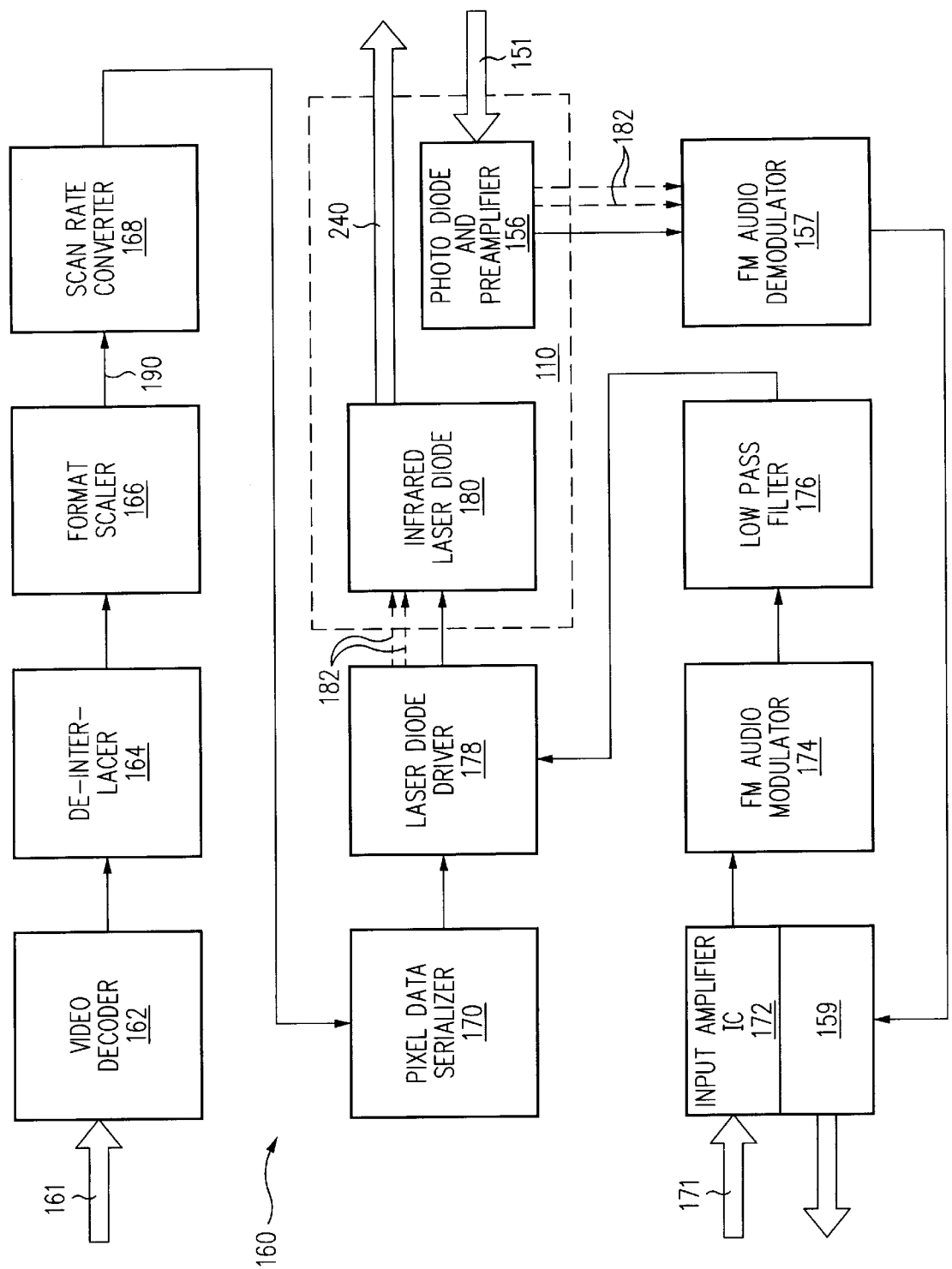
FIG. 2A is a functional block diagram of a video processing circuit located, for example, in a base station.

FIG. 2A is a functional block diagram of a video processing circuit 160 located, for example, in base station 112. An input video signal 161 enters at the upper left hand corner and is applied to a video decoder 162. Input signal sources (not shown) include conventional video sources, such as NTSC, PAL, or SECAM encoded composite sources, e.g., cameras, and 525/625 line component sources such as YUV or S-Video. Video decoder 162 consists substantially of a conventional Digital Multistandard Color Decoder IC, for example Philips Semiconductors, 811 East Arques Avenue, Sunnyvale, Calif. 94088, Model SAA 7110 Decoder.

In video decoder 162 the NTSC/PAL/SECAM analog video signals are demodulated and converted to digital format luminance and chroma (color) for processing by subsequent circuit modules. Video decoder 162 also provides scaling and offset of various video components such as hue, brightness, and saturation for user preferences.

Digitally formatted luminance and chroma signals from video decoder 162 are applied to a de-interlacer 164, which converts the signals into digital RGB format and then combines the odd and even line fields into a sequential frame format. De-interlacer 164 consists substantially of a conventional interlaced to sequential frame converter, for example, Genesis Microchip, Inc., 2071 Landings Drive, Mountain View, Calif. 94043, Model gmVLD8 De-Interlacer, with an external pixel buffer RAM memory. Since the odd and even scan fields are separated in time by either 1/50 or 1/60 sec., de-interlacer 164 interpolates between the two fields to minimize tearing of vertical lines when the image is rapidly panned.

The resulting RBG color pixel data are applied to a format scalar 166, which interpolates to a higher pixel resolution as required for the display. For example, VGA format data (640×480 pixels) is scaled to SVGA format data (800×600 pixels). Format scaler 166 consists substantially of a conventional image scaling and anti-aliasing IC, for example, Genesis Microchip, Inc., 2071 Landings Drive, Mountain View, Calif. 94043, Model gmZ1 Scaler. Scaling algorithms familiar in the art are used to minimize video artifacts created during the scaling process.

After scaling, the RGB pixel data are applied to a scan rate converter 168, which converts the video input frame rates of 50/60 Hz to 83.3/80 Hz to minimize the potential for visible flicker in the display. Scan rate converter 168 then outputs the frame data in separate red, green, and blue fields. Scan rate converter 168 is implemented using a Field Programmable Gate Array (FPGA), for example Xilinx, Inc., 2100 Logic Drive, San Jose, Calif., Model 4010 PQ160 FPGA, and a synchronous high speed SDRAM.

Figure 2B:
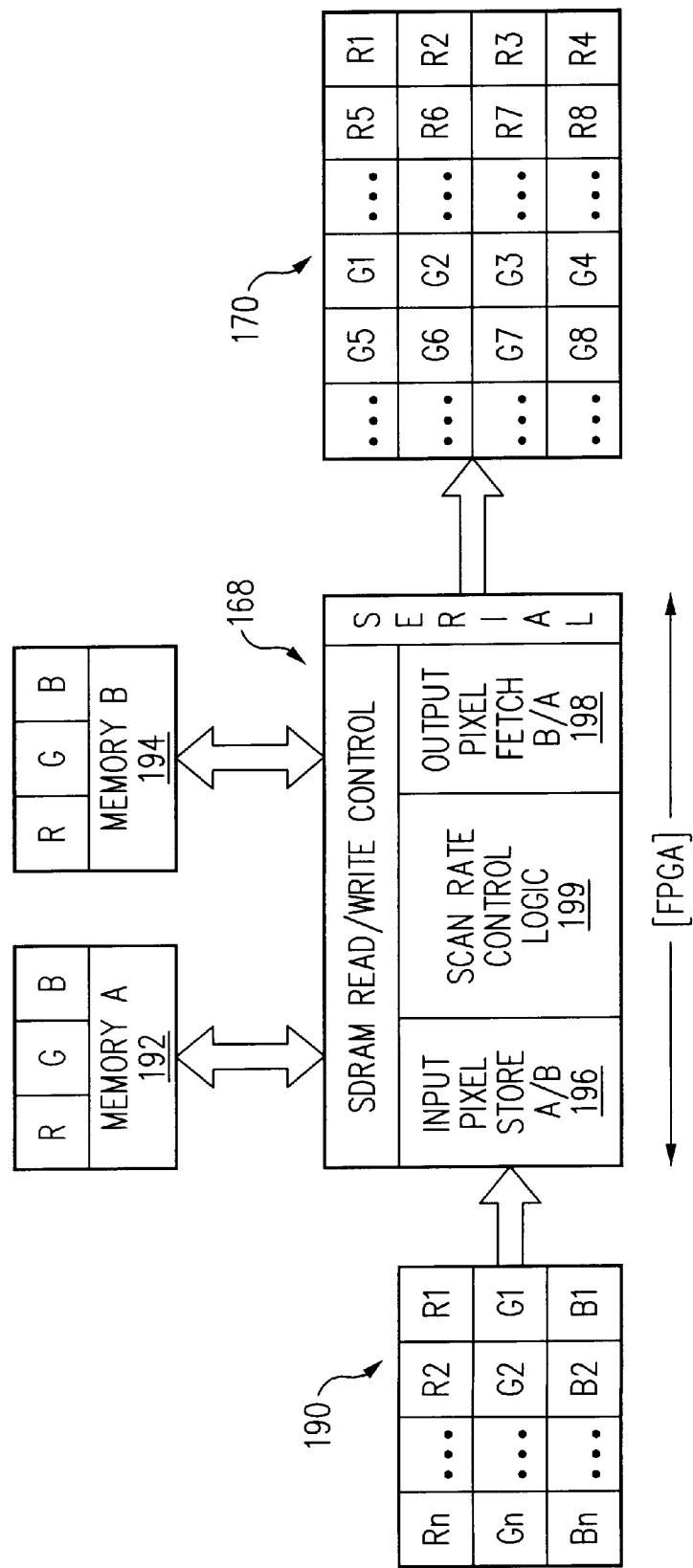
FIG. 2B is a functional block diagram illustrating the operation of a scan rate converter.

FIG. 2B is a functional block diagram illustrating the operation of scan rate converter 168. The digital RGB color pixel data 190 from format scaler 166 enters scan rate converter 168 from the left and is stored in one of two memory banks 192, 194. Each memory bank 192, 194 is segmented into red, green, and blue field storage labeled R, G, and B, to facilitate field sequential color imaging. Each memory segment can hold the red, green, or blue color value, for example an 8-bit quantity, for each of the 480,000 pixels in an SVGA (800×600) field. An input pixel store function 196 stores video frames alternately in memory bank 192 or 194.

Whereas input pixel store function 196 writes data into memory banks 192 and 194, an output pixel fetch function 198 reads data from the respective memory bank 192, 194, that was previously filled with data. In other words, input pixel store and output pixel fetch functions 196 and 198 respectively never overlap their use of the same memory bank 192 or 194. Rather, they alternate memory banks, thereby de-coupling input data from output data.

A scan rate control logic function 199 accepts data at a 50/60 Hz rate supplied by a video source and outputs the data at a higher rate, namely, 83.3/80 Hz. Scan rate control logic function 199 controls the flow of data in the sequential red, green, and blue fields, instructing output pixel fetch function 198 to insert repeating color fields to convert the effective frame rate. In some embodiments, headset display 140 requires four pixels of data to be loaded during each input cycle. In these embodiments, output pixel fetch function 198 is instructed to read four pixels, e.g., 32 bits, simultaneously and to present these pixel data in a burst format to a pixel data serializer 170.

Red, green, and blue color field data are serialized in pixel data serializer 170 (see FIG. 2A) into a stream suitable for transmission over a wireless link. In addition to serialization, pixel data serializer 170 inserts video synchronization information to define horizontal, vertical, and color syncs. Pixel data serializer 170 converts the parallel digital pixel color data into amplitude modulated signals using conventional digital to analog converters (DAC's). It then outputs the analog signals, e.g., four pixel values, into a high speed serial data stream suitable for transmission over the wireless (serial) link. Conventional sample-and-hold amplifiers are used to delay the analog signals for conversion to a serial analog data stream, as described above in connection with FIG. 1C.

Referring to FIG. 2A, optionally, an input audio signal 171 from a microphone or other conventional source (not shown) enters an input amplifier IC 172 with level control and high frequency boost to improve overall S/N ratio. The audio signal is then applied to an FM audio modulator 174, typically a voltage controlled oscillator (VCO), which converts the amplitude modulated signal to narrow band frequency modulated signal on a carrier. The FM modulated signal is bandpass limited by a low pass filter 176 to remove any unwanted high frequency signals generated by the FM modulation process, and is then combined with video data from pixel data serializer 170 in a laser diode driver 178, incorporating a high speed FET current amplifier. When combined, the audio signal is in the lower frequency portion of the IR modulation spectrum (frequency division multiplexing), and is easily recovered from the video using bandpass filters. The audio FM is then conventionally converted to a normal analog audio signal, e.g., for headphones, using an FM discriminator.

The combined serial video data and optional modulated audio data from laser diode driver 178 modulate an infrared laser diode 180, selected for its high frequency modulation capability, which converts the signal into a modulated IR beam. Laser diode driver 178 consists substantially of operational amplifier (OpAmp) IC's that drive a high speed FET amplifier, which in turn controls the output of commercial IR laser diode 180. Infrared light 240 from infrared laser diode 180 is shaped by lenses and focused into one end of an output optical fiber cable for transport to transceiver module 110, described below in more detail.

Optionally, a return audio signal 151 from headset 104 (transmitted through an incoming optical fiber cable) is applied to a photodiode and preamplifier 156, which converts the modulated optical signal to a low level modulated electrical signal, amplifies the low level signal, passband limits it using a conventional filter, and applies it to an FM audio demodulator (discriminator) 157, which recovers the audio signal. The audio signal is frequency conditioned to improve the signal to noise ratio at high frequency and to restore the overall audio fidelity of the signal. Finally, the audio signal is processed by a line driver IC amplifier with level control circuits 159 for output coupling to conventional audio output equipment (not shown).

Figure 2C:
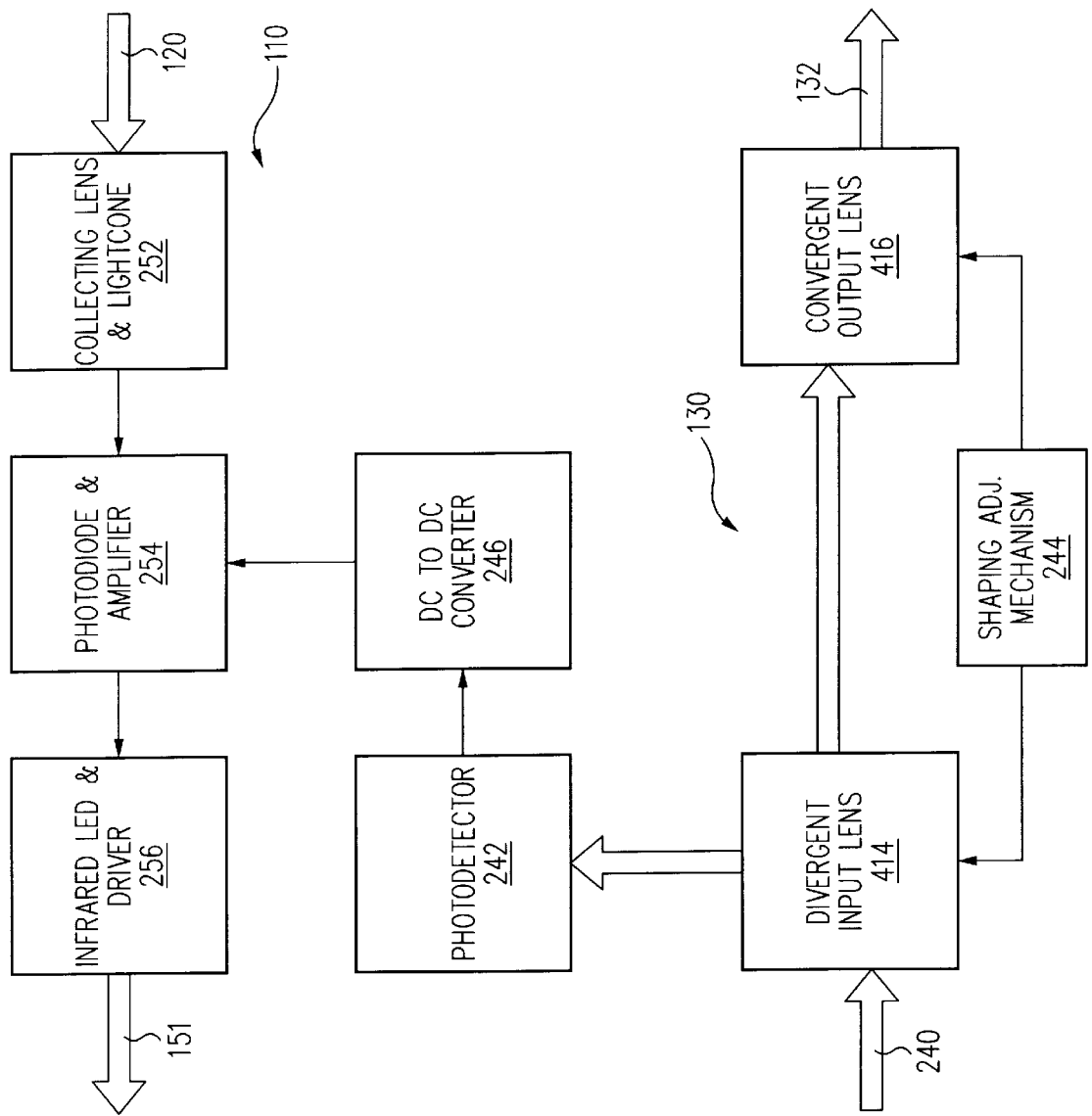
FIG. 2C is a block diagram of a transceiver module.
Figure 2D:
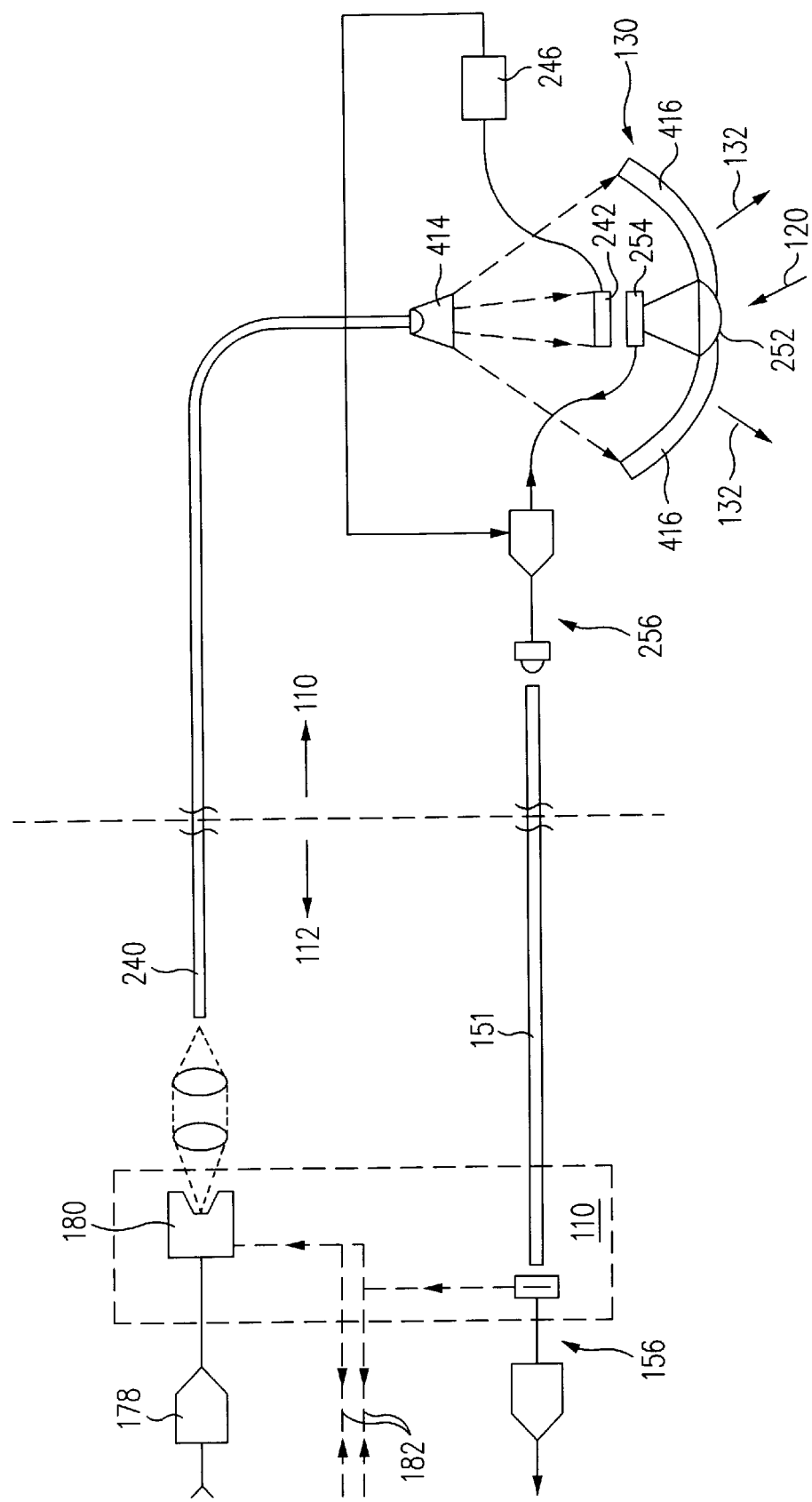
FIG. 2D is an optical schematic diagram of portions of a transceiver module and a base station.

FIG. 2C is a block diagram of transceiver module 110, which is used to distribute (broadcast) combined audio and video signals from base station 112 to headset 104. Transceiver module 110 also serves as a collection and relay module for optional audio signals returning from headset 104. In the embodiment shown in FIG. 1B, transceiver module 110 is located above and proximate to the area where headset 104 is used. This placement optimizes the signal distribution and provides the best image quality by minimizing reflections along the signal path. Transceiver module 110 can be implemented with either a single or a dual optical fiber tether from base station 112. For the present discussion, a dual fiber implementation is described. However, the respective functions of transceiver module 110 and base station 112 are substantially unchanged relative to the single optical fiber implementation. FIG. 2D is an optical schematic diagram of portions of transceiver module 110 and base station 112.

Modulated IR beam 240 carries combined video and optional audio infrared signals from base station 112 through an optical fiber to a diverging input lens 414 of shaping lens assembly 130. Input lens 414 spreads modulated IR beam 240 into a diverging pattern, a portion of which is collected by a photodetector 242, and the bulk of which is directed to a converging output lens 416 of shaping lens assembly 130 for transmission in a shaped IR signal pattern 132 toward remote receiver 146, e.g., headset 104. As described below in more detail, a shaping adjustment mechanism 244 sets the spacing between input/output lenses 414 and 416 respectively. If lenses 414, 416 are closely spaced, then shaped IR signal 132 is spread more horizontally. If lenses 414, 416 are widely separated, then shaped IR signal 132 is concentrated vertically. Shaping adjustment mechanism 244 as shown in FIG. 2C allows adjustment of the height of transceiver module 110, e.g., above an operating theater, and corresponding control of the shape of IR beam pattern 132 to cover an area where headset 104 is located.

Optionally, a return modulated audio IR signal 120 from headset 104 is collected by a collecting lens and light cone 252 in transceiver module 110, and the collected light directed to a photodiode and amplifier 254. Photodiode and amplifier 254 convert and amplify the optical signal to produce an electric audio signal, which drives an IR LED 256. IR LED 256 re-transmits the amplified audio IR signal 151 through an optical fiber tether to photodiode and preamplifier 156 in base station 112. In some embodiments, an amber or other visible wavelength LED can substitute for IR LED 256. Photodetector 242 generates a photoelectric voltage, which is applied to a DC-to-DC converter 246 to provide electrical power required to operate photodiode and amplifier 254 and to drive LED 256. As shown in FIG. 2D, collecting lens and light cone 252 are substantially coaxial relative to the elements of shaping lens assembly 130. However, it will be apparent to those skilled in the art that other configurations are possible, including physical separation between shaping lens assembly 130 and collecting lens and light cone 252. Similarly, shaping lens assembly 130 can be replaced in transceiver module 110 by projection lens 108, for example a conventional converging optical element.

Alternatively, transceiver module 110 is connected to base station 112 by an electrically conductive coaxial cable 182, shown schematically in FIGS. 2A and 2D by dashed lines with arrows. In this implementation, the electronics and optics of base station 112 are redistributed, for example all optical components, LEDs, and photodetectors are included in transceiver module 110, as shown enclosed by dashed outlines in FIGS. 2A and 2D. However, the overall function remains as described above, namely, to deliver the modulated IR energy in a pattern that optimizes the energy of IR signal 106 available to headset 104. In some of such embodiments, infrared laser diode 180 can alternatively be replaced by one or more high-frequency infrared LED's, for example, Siemens Microelectronics, Inc., 10950 North Tantau Avenue, Cupertino, Calif. 95014 Model SFH4592.

Figure 2E:
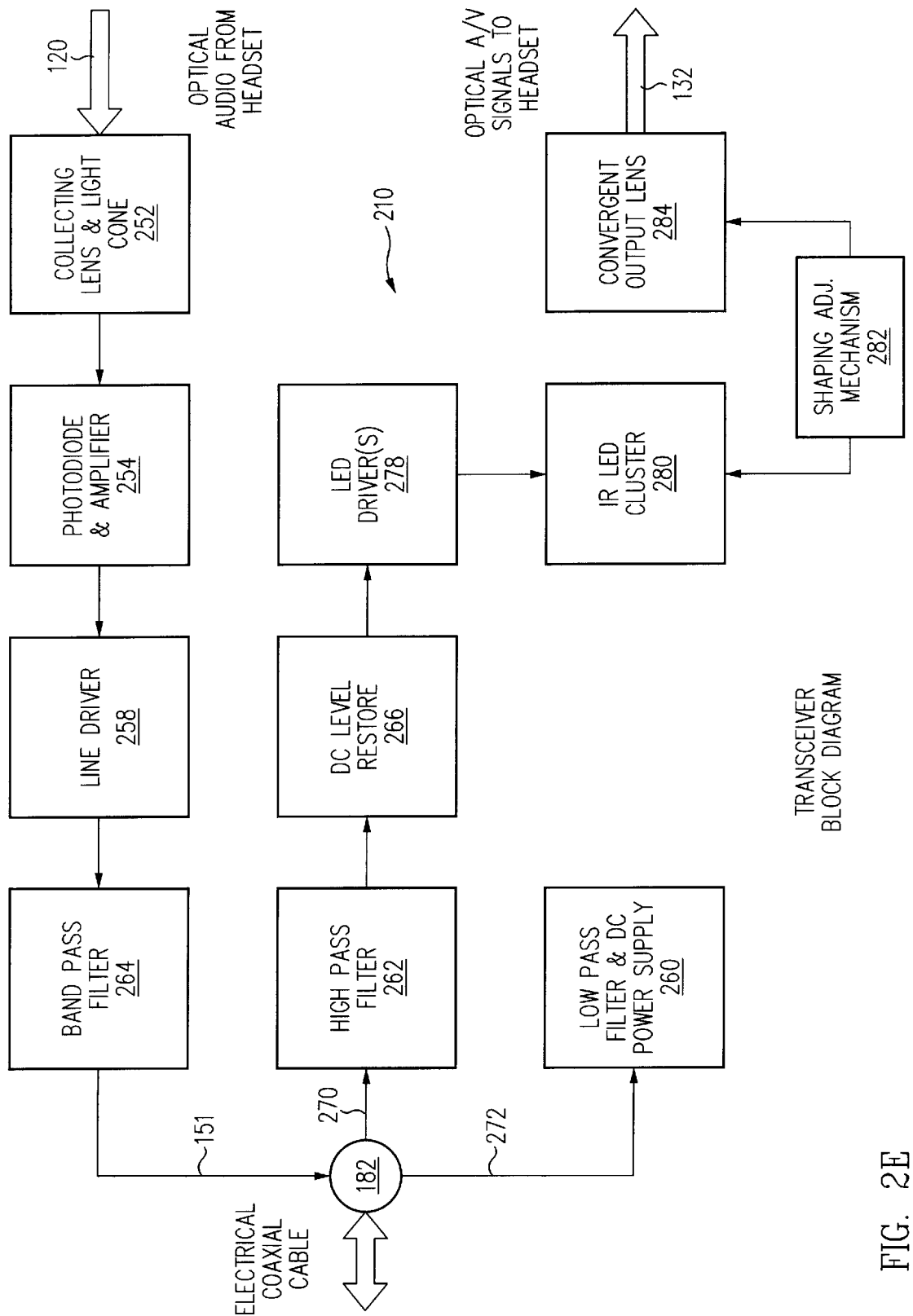
FIG. 2E is a more detailed transceiver schematic block diagram, in accordance with a further embodiment of the present invention.

FIG. 2E is a more detailed transceiver schematic block diagram, in accordance with a further embodiment of the present invention. Transceiver circuit 210 is connected with base station 112 through electrically conducting coaxial cable 182, which carries respective video signals 270, audio signals 151, and DC electrical power 272. DC power 272 from coaxial cable 182 is filtered from audio and video signals by a low pass filter and power supply 260, which provides power for the active elements of transceiver circuit 210. Video signal 270 from coaxial cable 182 is filtered through a high pass filter 262 and is applied through a DC level restore module 266 to LED drivers 278, which drive an IR LED cluster 280.

The modulated IR LED beam is shaped by an alternative single-element shaping lens 284 to produce shaped IR beam 132. An alternative shaping lens assembly includes LED cluster 280, shaping lens 284, and a shaping adjustment mechanism 282, similar to shaping adjustment mechanism 244, which controls the shape of IR beam 132 by adjusting the separation between shaping lens 284 and LED cluster 280. Optional return audio signal on return IR beam 120 is transmitted through collecting lens and lightcone 252 onto photodiode and amplifier 254 where it is converted into an electrical signal. The audio electrical signal from photodiode and amplifier 254 is amplified by a line driver 258 and is then filtered through a bandpass filter 264 prior to transmission as audio carrier signal 151 through coaxial cable 182 to base station 112.

Figure 3A:
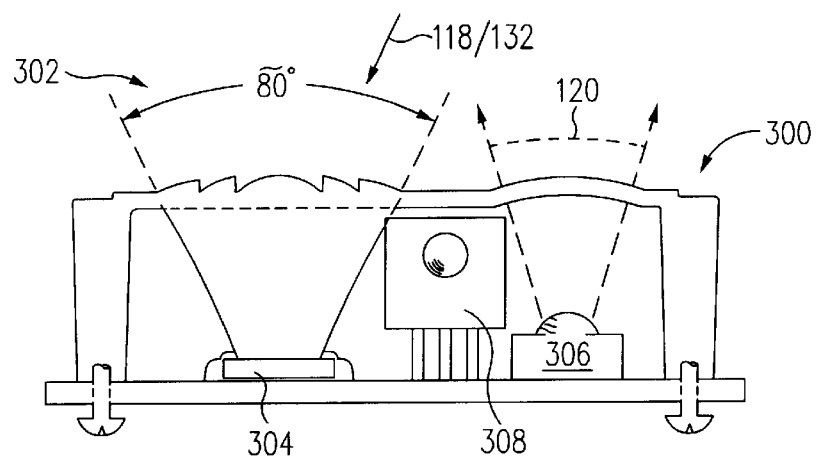
FIG. 3A is a schematic front view of an IR module incorporated in a headset, containing components of the IR video interface.
Figure 3B:
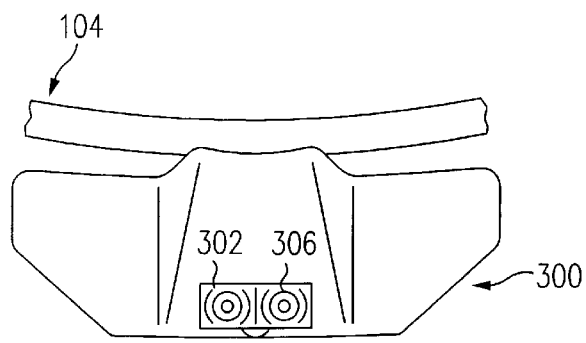
FIGS. 3B and 3C are top and side schematic views, respectively, of a user wearing an embodiment of a headset including an IR module.
Figure 3C:
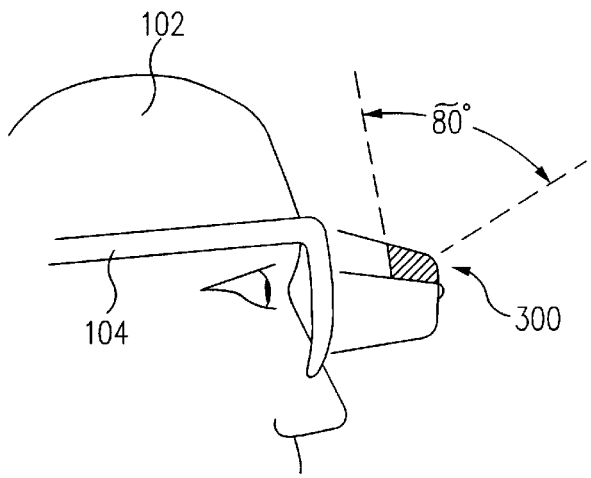

The optical components mounted at headset 104 are complementary to those mounted at transceiver module 110. FIG. 3A is a schematic front view of an IR module 300 containing components of IR video interface 100 incorporated in headset 104. FIGS. 3B and 3C are top and side schematic views, respectively, of a user wearing an embodiment of headset 104 including IR module 300. IR module 300 is mounted away from the user's peripheral vision field and above the LCD and associated display optics (see Hebert, cited above), thereby providing a substantially unobstructed wide angle reception path to the ceiling or to an overhead transmitting lens.

Figure 3D:
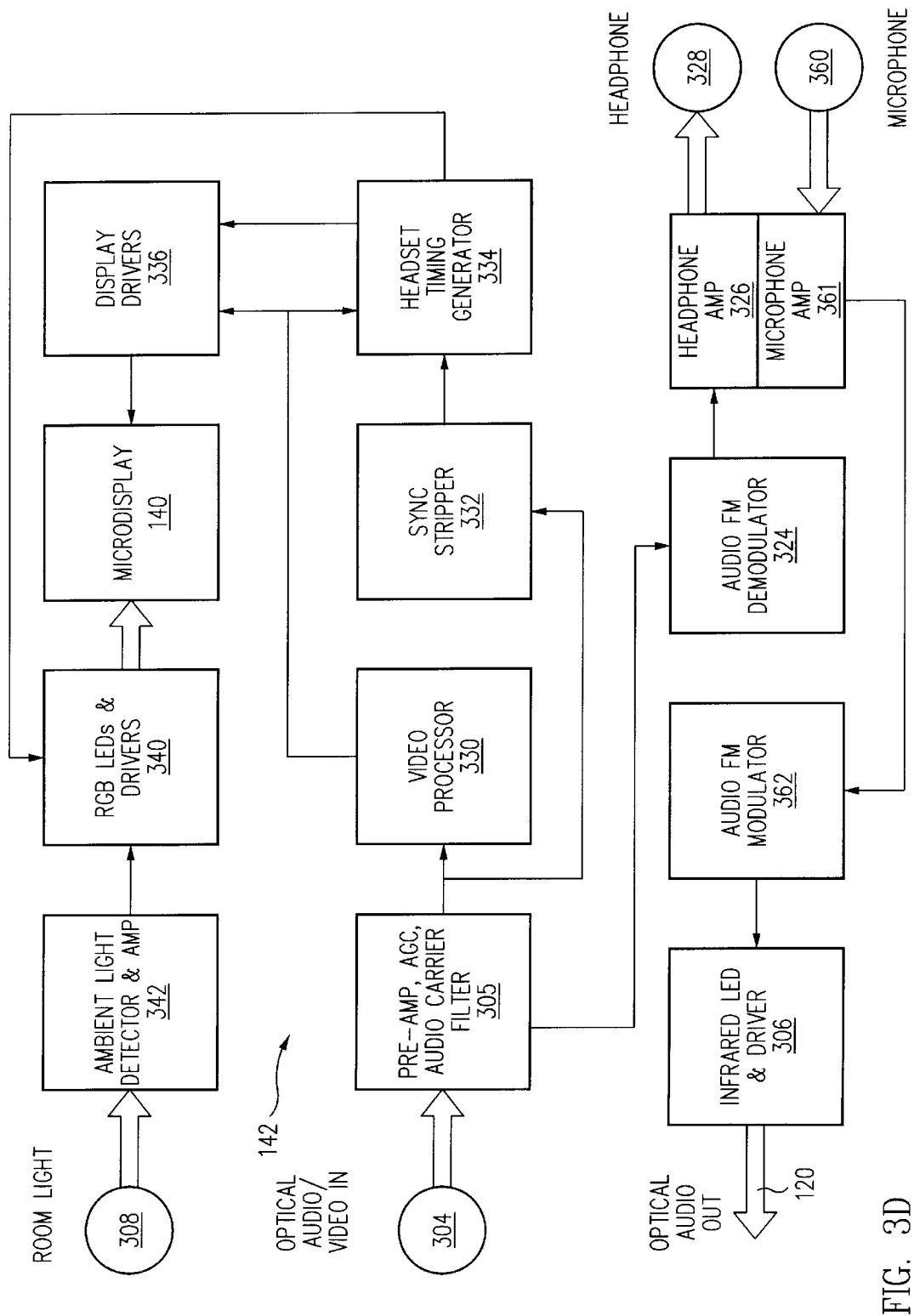
FIG. 3D is a functional block diagram of a remote electronics circuit, located for example at a headset.

FIG. 3D is a functional block diagram of remote electronic circuit 142, located for example at headset 104. The combined video and optional audio low level electronic signals from IR photodetector 304 enter adjacent to the middle left hand side of FIG. 3D. The signals are applied to preamplifier/AGC/audio carrier filter module 305 where the signal is amplified and level adjusted by a conventional automatic gain control (AGC) circuit.

The optional audio carrier portion is separated using a conventional bandpass filter (frequency domain demultiplexing) and applied to an FM demodulator 324, which recovers the audio signal in a manner similar to return audio demodulator 157. The recovered audio signal is then applied to a headphone amplifier 326 configured for driving a conventional dynamic headphone speaker element 328.

The separated video signal portion continues into a video processing module 330, where gamma correction and black level control are performed using conventional techniques. Gamma correction compensates for the different response of headset display 140 relative to the response of a traditional phosphor based CRT. Gamma correction adjusts the video signal, such that headset display 140 exhibits a more accurate range of brightness than would be realized without gamma correction. Black level control restores the correct baseline DC voltage to the video waveform.

The output from signal processing module 305 is further separated at a sync stripper module 332 into synchronization components, which generate timing signals. The synchronization components are applied to a headset timing generator 334, which generates signals that control display and LED illumination sub-systems.

Figure 3E:
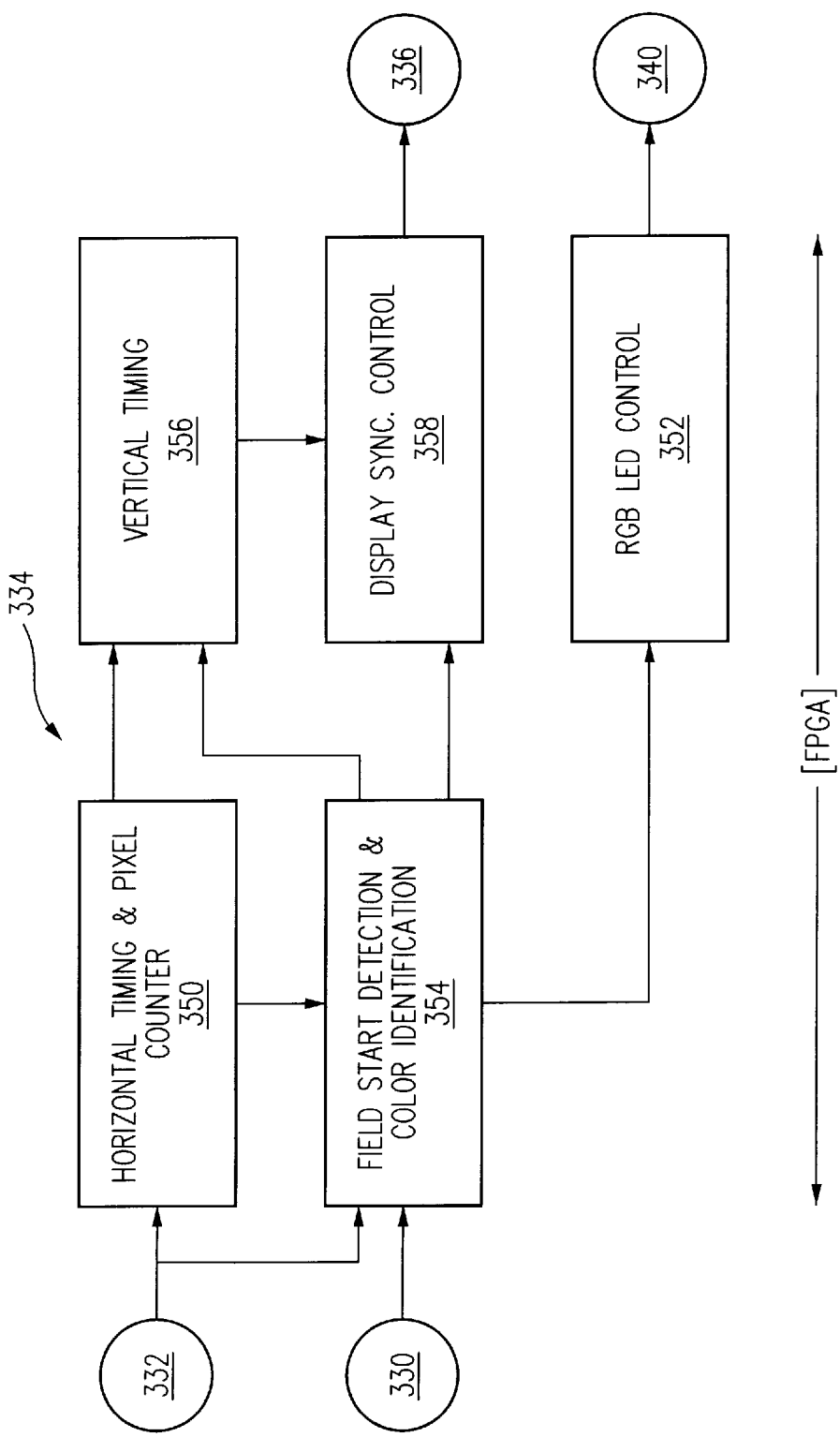
FIG. 3E is a detailed functional block diagram of a headset timing generator.

FIG. 3E is a detailed functional block diagram of headset timing generator 334, which is implemented with a field programmable gate array (FPGA), similar to that described in connection with FIG. 2A. Composite sync components from sync stripper module 332, including horizontal start pulses and field start pulses, are applied to headset timing generator 334. Using the horizontal start pulses, a horizontal timer and pixel counter module 350 locates the beginnings of lines and counts the pixels within each line, for example, 800 active pixels per line of display 140 plus inactive pixels used for timing and control. A timing window is generated at the expected field start pulse time (with respect to the horizontal start pulse), that is used by field start detection and color identification module 354 to detect a start of field condition. When start of field is detected, a vertical timing module 356 is reset to zero and commences counting lines in a field, for example, 600 lines. During the vertical timing interval, a small number of non-video lines from video processor module 330 are encoded with color identifiers. These color identifiers are detected by field start detection and color identification module 354 and are used by a RGB LED control module 352 to synchronize display LEDs 340 with the appropriate color fields. Vertical timing pulses from vertical timing module 356 and color IDs from field start detection and color identification module 354 are used by display sync control module 358 to generate signals that control the operation of a display drive module 336 and microdisplay 140.

The outputs from headset timing generator 334 include control signals for display drive module 336 and control signals for display LEDs 340. In operation, display 140 cycles through erase, load, and illuminate phases. Timing generator 334 is responsible for correctly sequencing these phases.

Display drive module 336 demultiplexes the video pixels, converting serial pixel analog voltages to parallel analog voltages suitable for driving a display. Microdisplay 140 and associated drivers 336 receive video data from video processor module 330 and control signals from headset timing generator 334. These are used to load the sequential color field data, which are stored in memory cells internal to microdisplay 140. After the data are loaded and stabilized, a selected red, green, or blue LED 340 is pulsed to illuminate display 140 with the correct color.

The overall brightness of display 140 is adjusted using an optional ambient light detector circuit 342. Light from the room is measured by a photodetector 308 to provide a control signal to boost or reduce the average brightness level of LEDs 340.

An optional return audio signal is generated by a microphone 360 mounted at headset 104, and is processed by audio electronics including a microphone amplifier 361 and an audio FM modulator 362, in a manner similar to that described in connection with FIG. 2A. The processed return audio signal drives an infrared LED 306, thereby generating modulated return IR beam 120, which is transmitted through the atmosphere to transceiver module 110, where it is collected and relayed to base station 112.

An alternative return audio implementation employs burst mode multiplexing during periods when there is no video transmission. However, this scheme requires more complex circuitry and competes with video data for bandwidth.

Figure 4A:
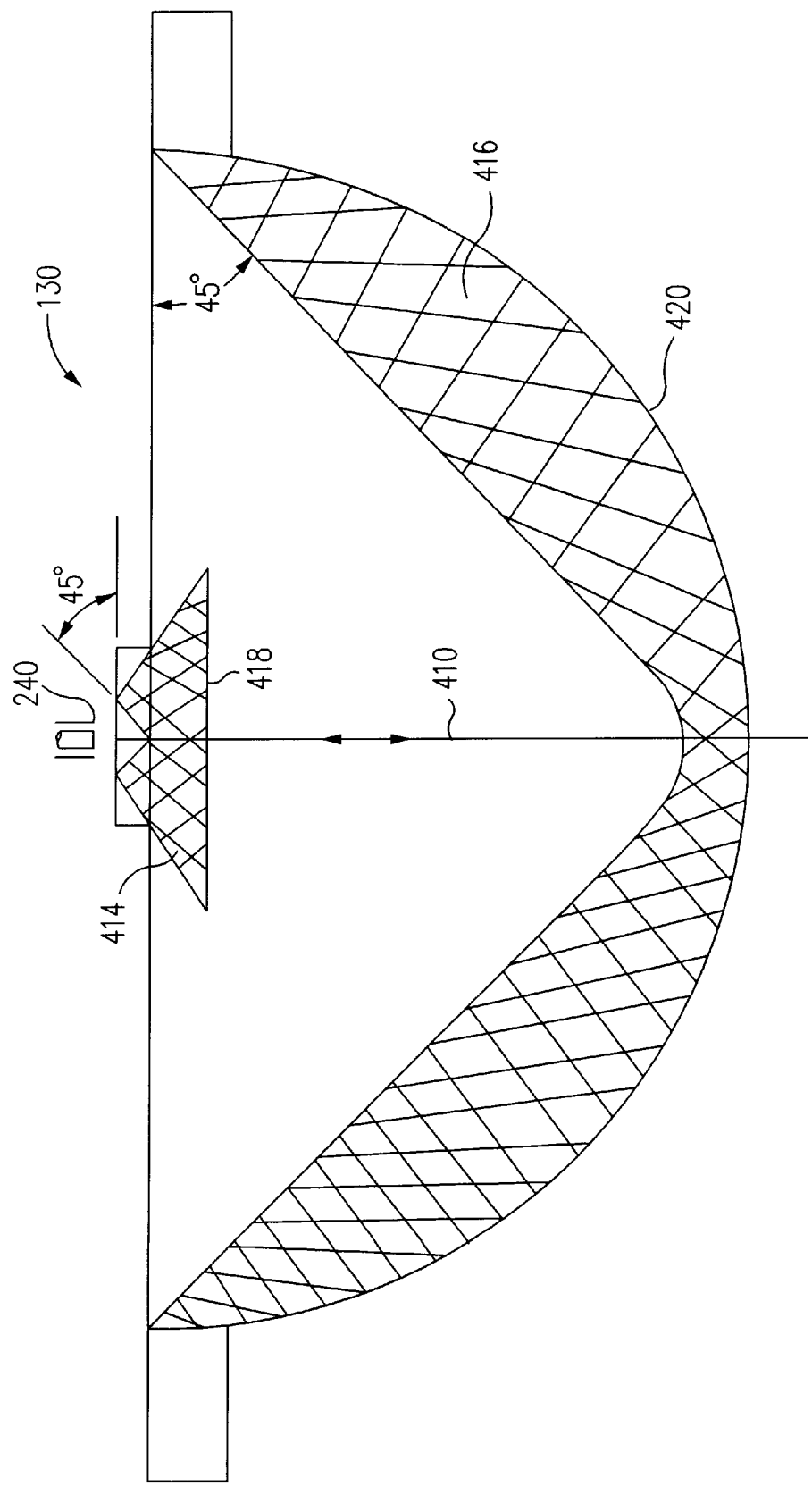
FIG. 4A is a cross-sectional optical diagram of a shaping lens, in accordance with an embodiment of the present invention.

FIG. 4A is a cross-sectional view of shaping lens assembly 130, in accordance with an embodiment of the present invention. For clarity, shaping lens assembly 130 as shown in FIG. 4A is absent collecting lens and light cone 252 pictured coaxially in FIG. 2D. While shaping lens assembly 130 is nominally rotationally symmetric about a symmetry axis 410, it can alternatively be designed to provide an azimuthally varying radiation pattern about axis 410. Although any optically radiative source can be used, the present embodiment shows modulated IR beam 240 delivered through an optical fiber extending from laser diode source 180 (see FIG. 2D).

Shaping lens assembly 130 includes an input lens 414, having a divergent conic shape; and an output lens 416, having a convergent conic shape. The hollow conical input surfaces of input lens 414 and output lens 416 are oriented at approximately 45 degrees relative to axis 410. The shape of the output surface 418 of input lens 414 is flat. The shape of the output surface 420 of output lens 416 is approximately hemispherical. Input lens 414 and output lens 416 are typically made of optically transmissive polymeric material with high optical quality in the visible and near infrared wavelength range extending from approximately 700 nm to approximately 1,100 nm. Suitable materials for input lens 414 and output lens 416 include polymethyl methacrylate and polycarbonate. The embodiment of shaping lens assembly 130 as described in connection with FIG. 4A is aspheric.

Figure 4B:
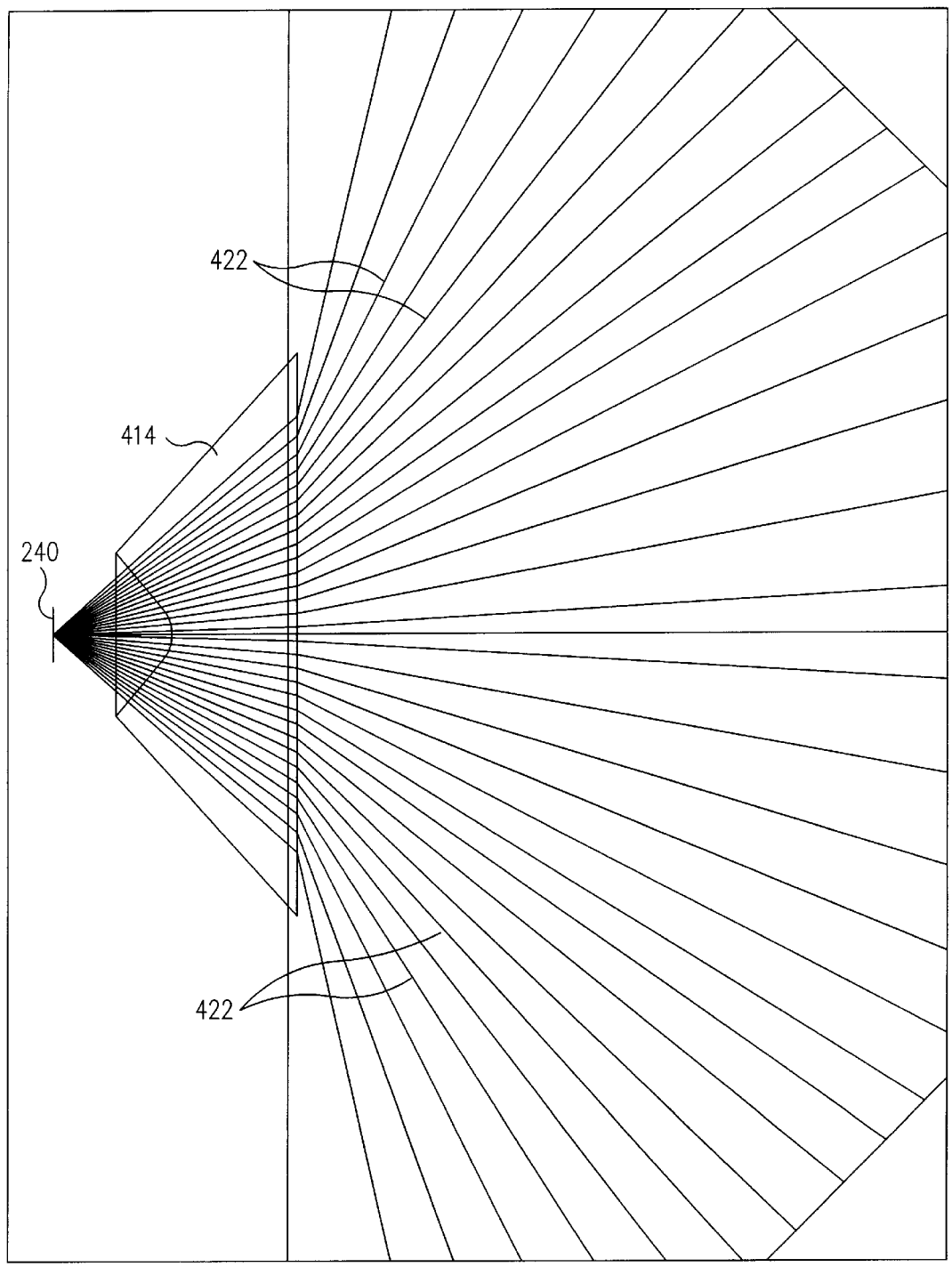
FIG. 4B is a cross-sectional diagram illustrating the performance of an input lens of a shaping lens.

FIG. 4B is a cross-sectional schematic diagram illustrating the performance of input lens 414 accepting IR energy from modulated IR beam 240 and separating this input energy into conical side lobes 422 with energy densities maximized approximately 45 degrees off-axis. This output energy pattern is typically rotationally symmetric, as described above.

Figure 4C:
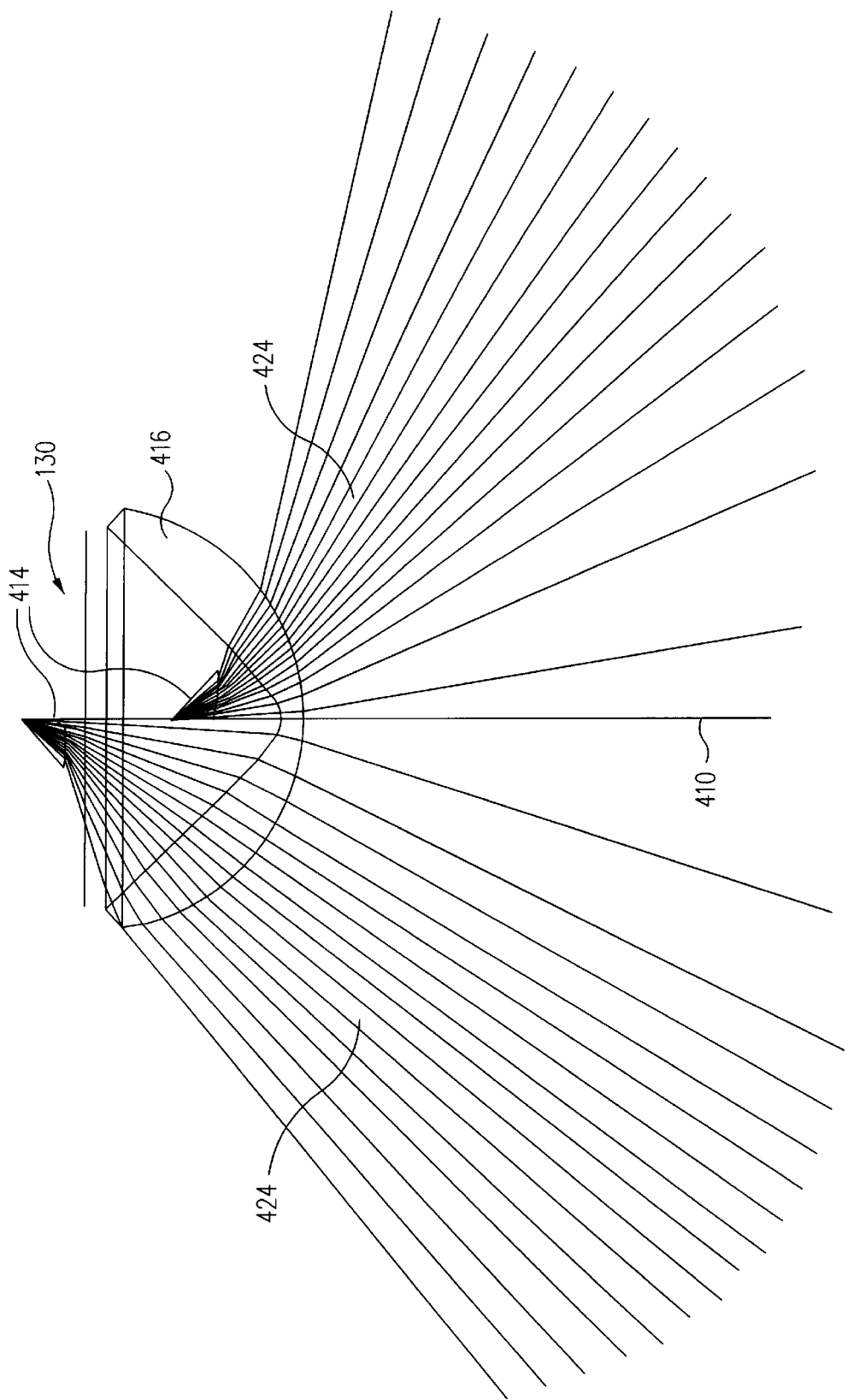
FIG. 4C is a split cross-sectional diagram illustrating the overall performance of a shaping lens.

FIG. 4C is a split cross-sectional diagram illustrating the adjustable orientation of the output radiation pattern from shaping lens assembly 130. Input lens 414 and output lens 416 are aligned and adjustably separated along their common axis 410. The angular spread of the refracted output energy density pattern, indicated by the directions and spacings of lines 424, is controlled by the separation between input and output lenses 414 and 416. The right portion of FIG. 4C shows a wide angular spread of the output energy density pattern resulting from a close separation between input lens 414 and output lens 416. The left portion of FIG. 4C shows a narrower angular spread of the output energy density pattern resulting from a larger separation between input lens 414 and output lens 416. Higher densities occur in side lobes away from axis 410, as indicated by the closer spacings between lines 424.

Figure 4D:
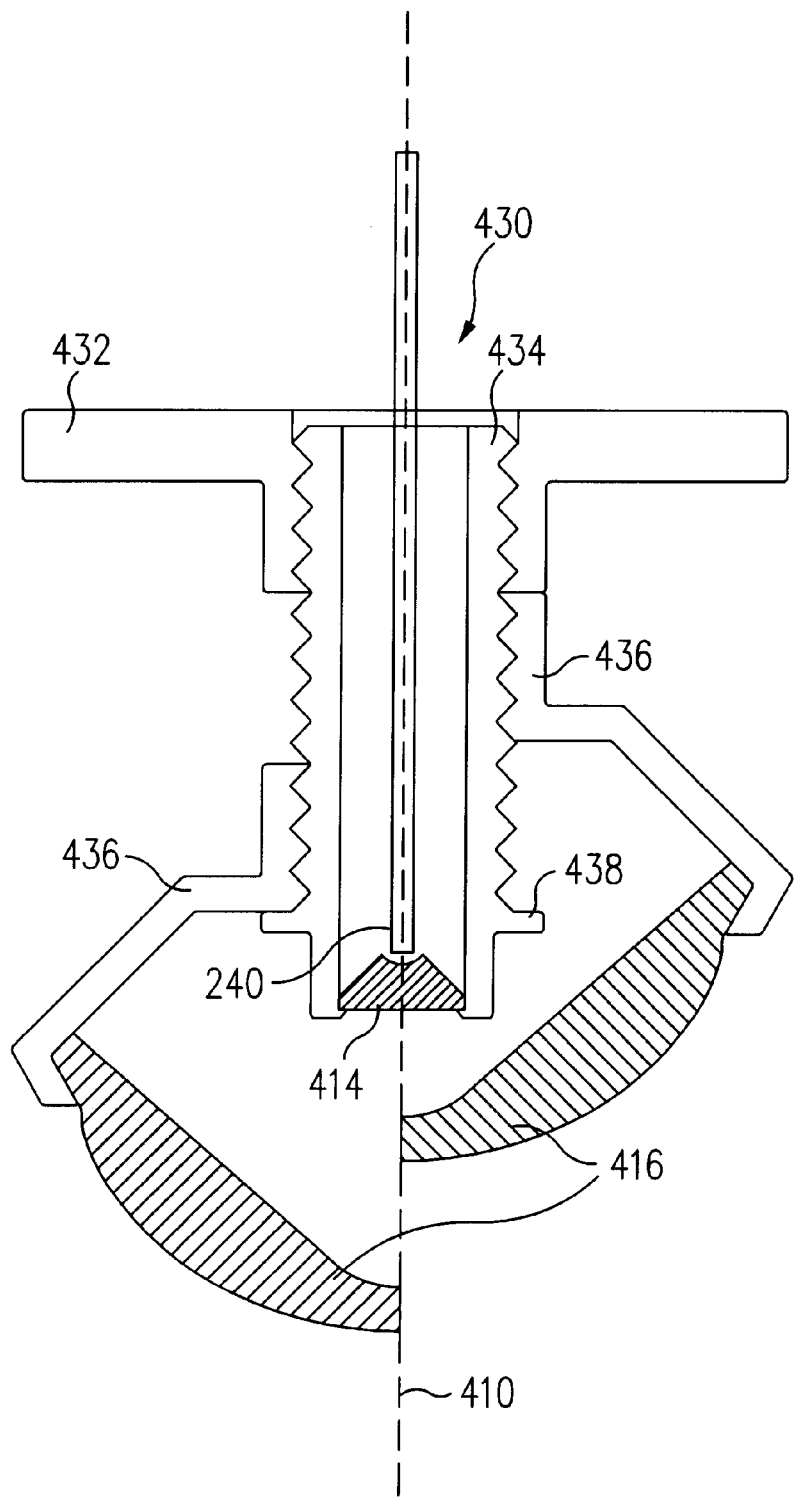
FIG. 4D is a cross-sectional view of one embodiment of a spacing control mechanism for a shaping lens.

FIG. 4D is a cross-sectional view of one embodiment of a spacing control mechanism 430 for adjusting the separation between input lens 414 and output lens 416 along common axis 410. The overall assembly of shaping lens assembly 130 is supported by an outer flange 432, which is fastened to a plate or bulkhead (not shown). A hollow threaded tube 434 attached to outer flange 432 and substantially coaxial with axis 410 supports input lens 414 at a specified distance from modulated IR beam 240. A nut 436 containing output lens 416 engages hollow threaded tube 434, such that the separation between input lens 414 and output lens 416 along axis 410 is adjusted by rotating nut 436 about axis 410 on hollow threaded tube 434. For purposes of illustration, FIG. 4D is split, the left portion showing maximum separation and the right portion showing minimum separation between input lens 414 and output lens 416. An inner flange 438 around hollow threaded tube 434 prevents nut 436 from rotating off the end of hollow threaded tube 434.

Since it is desired to direct as much radiant energy as possible into the likely field of use, the more downward radiation pattern shown in the left portion of FIG. 4C is more appropriate for a transceiver module 110 located at a higher level (e.g., toward ceiling 116), whereas the more horizontally spread radiation pattern shown in the right portion of FIG. 4C is more appropriate for a transceiver module 110 located at a lower level, e.g., below a surgical lighting system (typically 1.8 meters to 3.0 meters above floor level).

Alternatively, the angular spread of the IR output energy pattern can be controlled by varying the distance between modulated IR beam 240 and input lens 414.

Figure 4E:
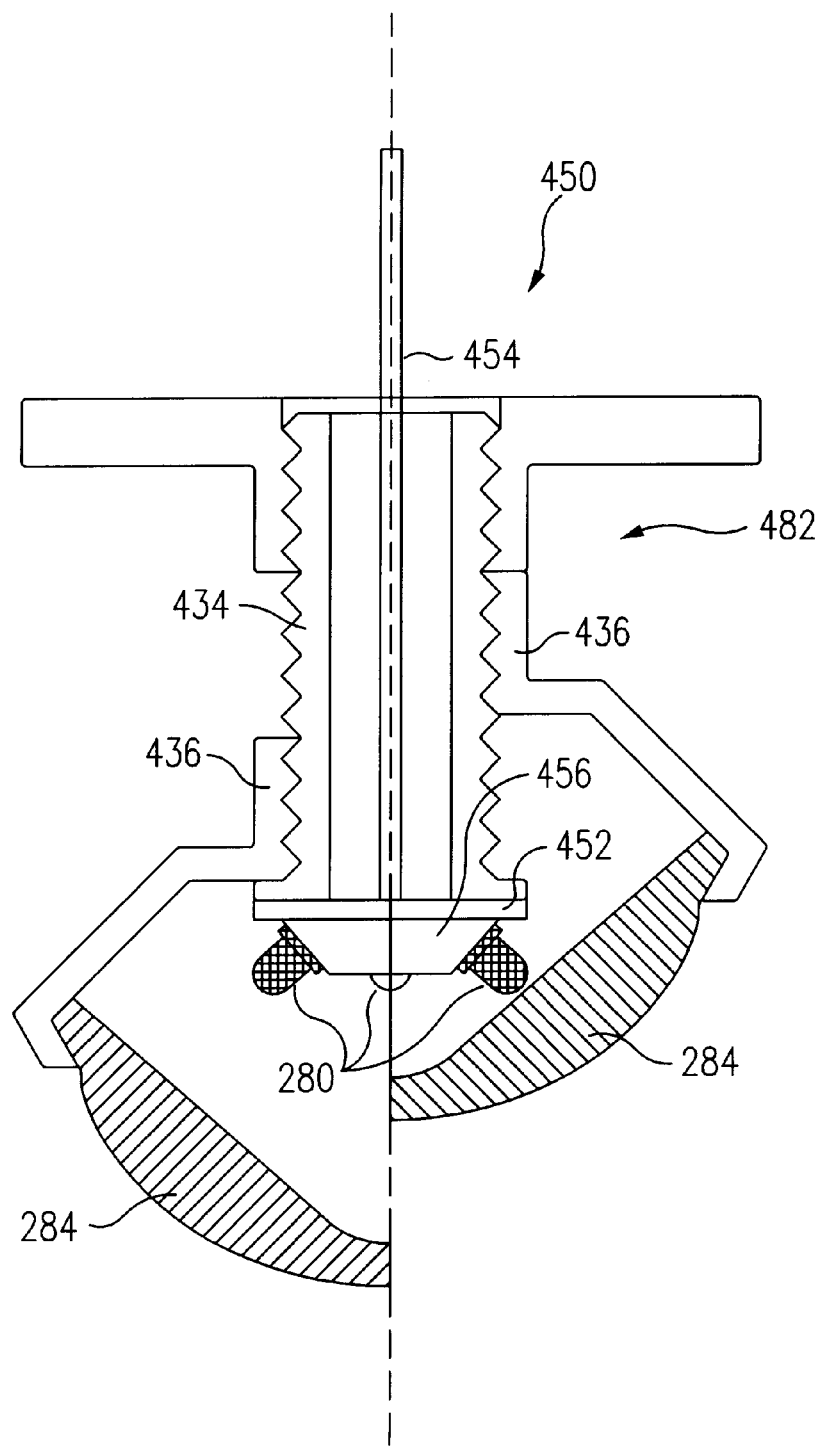
FIG. 4E is a split cross-sectional view of a shaping lens assembly combined with an IR LED cluster as a modulated beam source.

FIG. 4E is a split cross-sectional view of an alternative shaping lens assembly 450 combined with an IR LED cluster as a modulated beam source (see also FIG. 2E). Shaping lens assembly 450 includes a shaping control mechanism 282 similar in structure and operation to shaping control mechanism 430 illustrated in FIG. 4D. An IR LED cluster 280 is attached to an alignment fixture 456 on a printed circuit card 452 mounted to hollow threaded tube 434. IR LED cluster 280 is driven by an electrical signal through a coaxial cable 454. A single-element shaping lens 284, configured substantially the same as converging output lens 416, is mounted onto rotating nut 436.

Figure 5A:
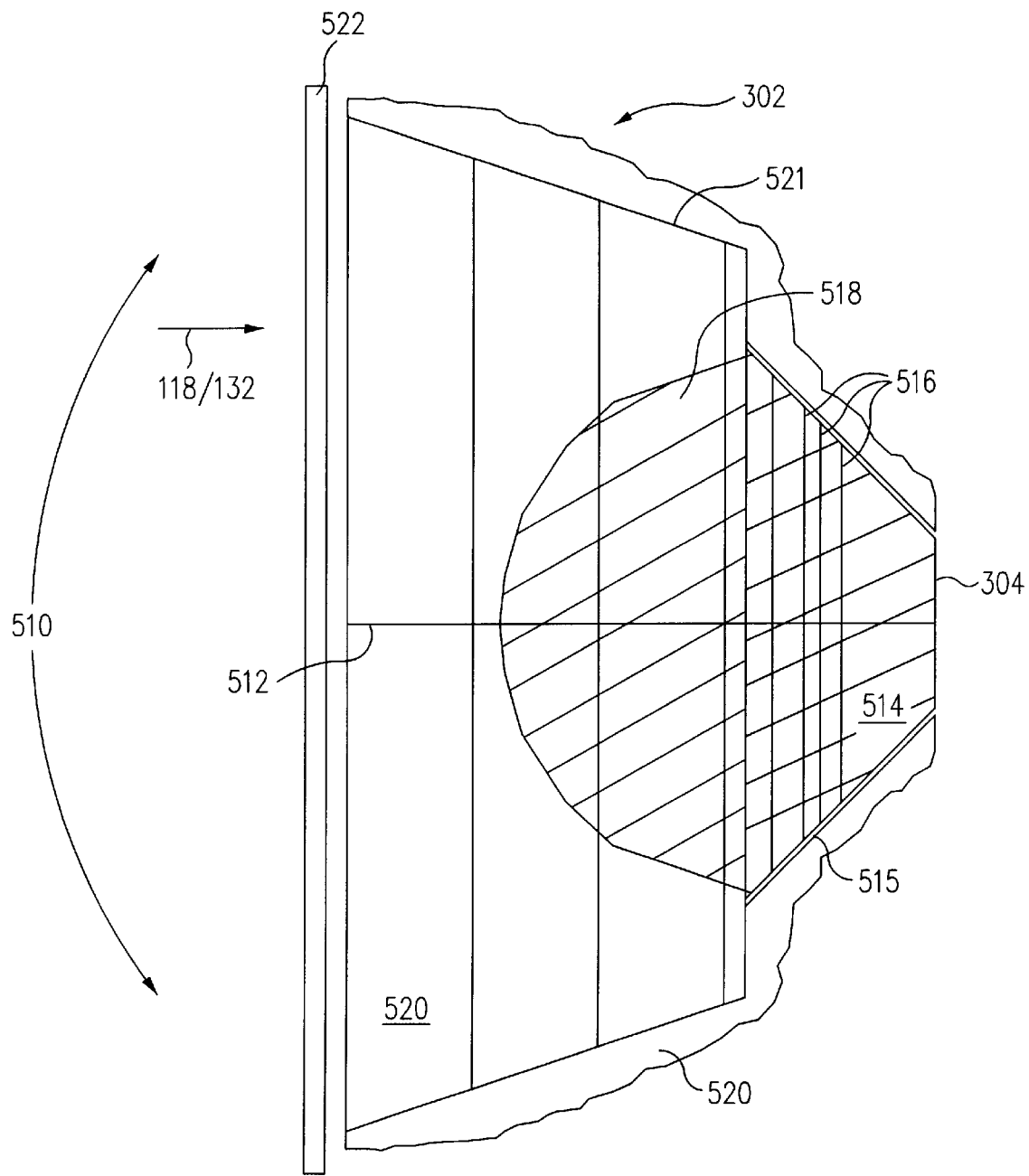
FIG. 5A is a cross-sectional schematic diagram of a collecting lens assembly, in accordance with an embodiment of the present invention.

FIG. 5A is a cross-sectional schematic diagram of collecting lens assembly 302 at headset 104, in accordance with an embodiment of the present invention. Collecting lens assembly 302 is configured to achieve both a large angular field of view 510, e.g., to accommodate head motion, and a large entrance pupil to receive maximum energy from IR signal 118 or 132. Although collecting lens assembly 302 is nominally rotationally symmetric about a symmetry axis 512, it can alternatively be configured to provide an azimuthally variable detectivity pattern about axis 512.

Photodetector 304 can be any photosensitive device having the optical and electronic responses required for the application, but is shown in FIG. 5A as a silicon device selected for its high frequency electronic performance and for high sensitivity to infrared radiation over a wavelength region of approximately 700 nm to approximately 1100 nm. Photodetector 304 is optically cemented to one end of an inner light cone 514, which is solid and has concentric ribs 516 on its outer walls 515. Outer walls 515 are oriented, for example, at a 45-degree angle relative to symmetry axis 512. Optical cementing avoids total internal reflection losses at the detector-lens interface at steep angles of incidence. Concentric ribs 516 diffusely reflect IR radiation back into collecting lens assembly 302, that would otherwise escape laterally.

Attached coaxially to inner light cone 514 is a wide-angle collecting lens 518 having a numerical aperture of approximately f/0.8, which provides a large entrance pupil. The embodiment of wide-angle collecting lens 518 as shown in FIG. 5A is aspheric. Wide-angle collecting lens 518 and inner light cone are typically made of an optically transmissive polymeric material (for example ULTEM® grade polycarbonate manufactured by the General Electric Company), and can be fabricated as a combined monolithic element. Disposed coaxially around wide-angle collecting lens 518 and inner light cone 514 is a hollow outer conic cavity 520, having polished inner walls 521, which reflects IR signal 118 or 132 into wide-angle collecting lens 518 and inner light cone 514 over a wider aperture. Inner walls 521 are preferably metallic, typically aluminum for high reflectivity and durability. Inner walls 521 are oriented, for example, at an angle of approximately 19 degrees to approximately 27 degrees relative to symmetry axis 512. An optical filter 522, such as KODAK WRATTEN® No. 87B, covers the entrance aperture of outer conic cavity 520. Alternatively, an optical filtering material is incorporated into the material of wide-angle collecting lens 518. Collecting lens and light cone 252, shown in FIG. 2D, has substantially the same structure as collecting lens assembly 302.

Figure 5B:
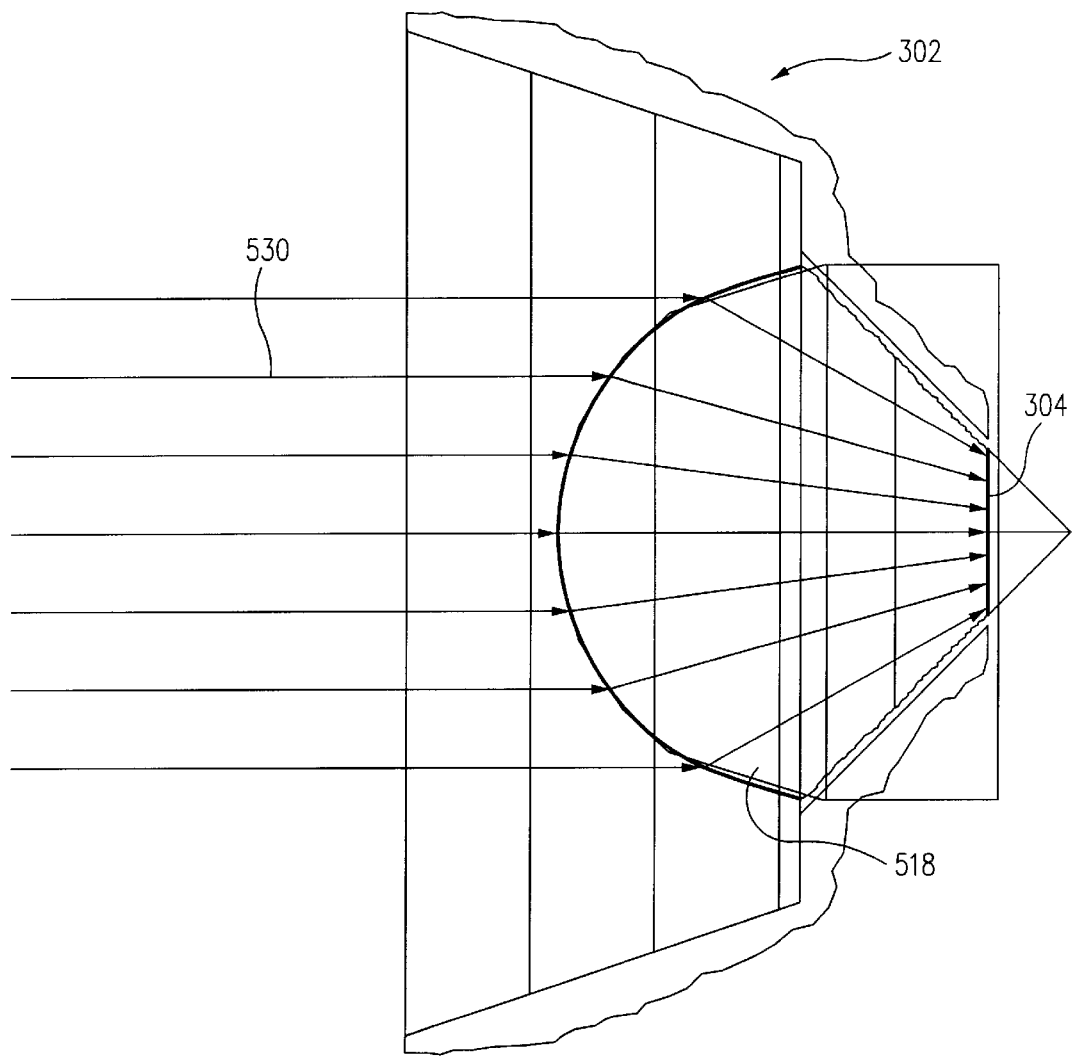
FIGS. 5B–5D are cross-sectional schematic diagrams illustrating the transmission and capture of IR radiation incident from various angles onto a collecting lens assembly.
Figure 5C:
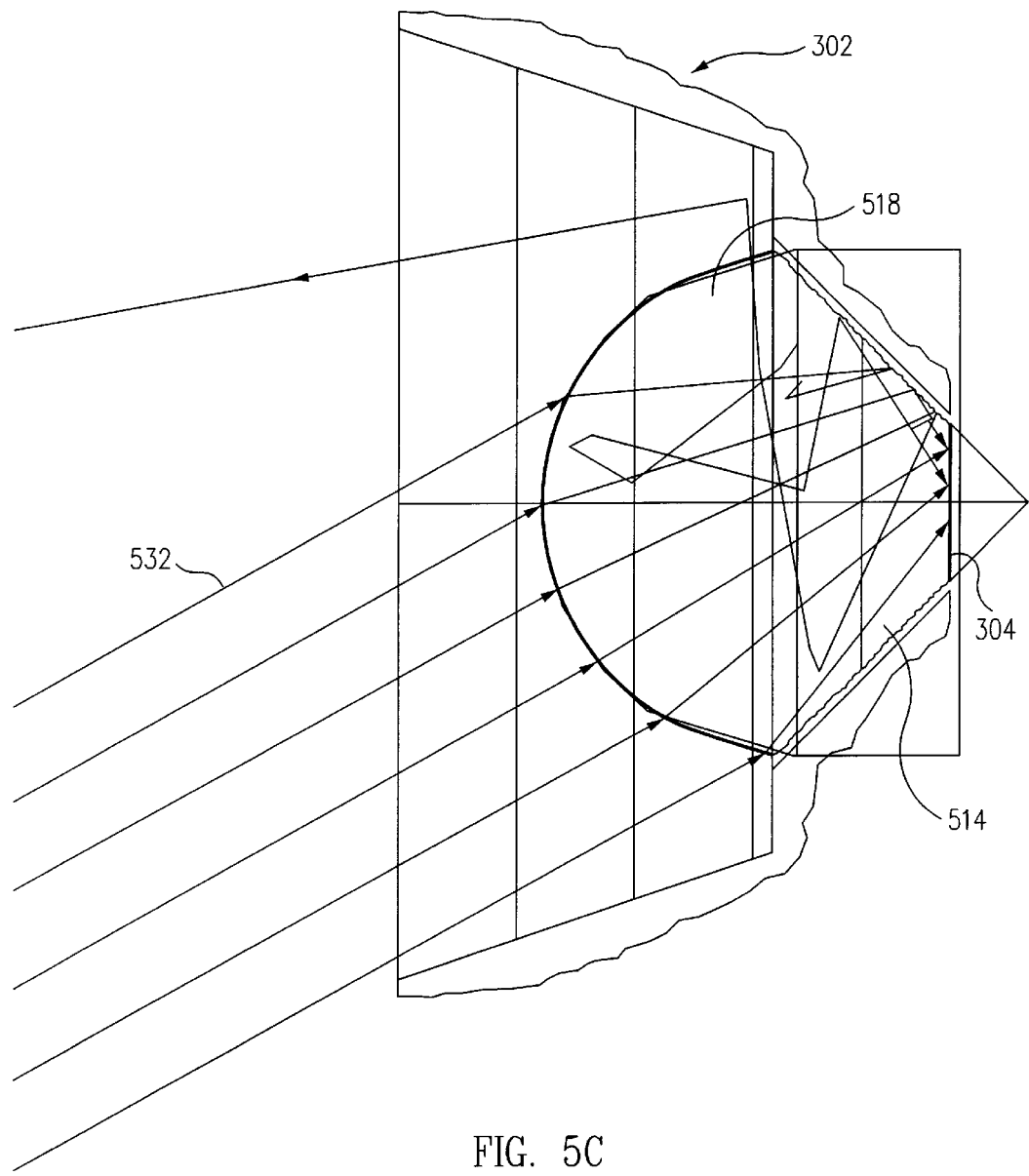
Figure 5D:
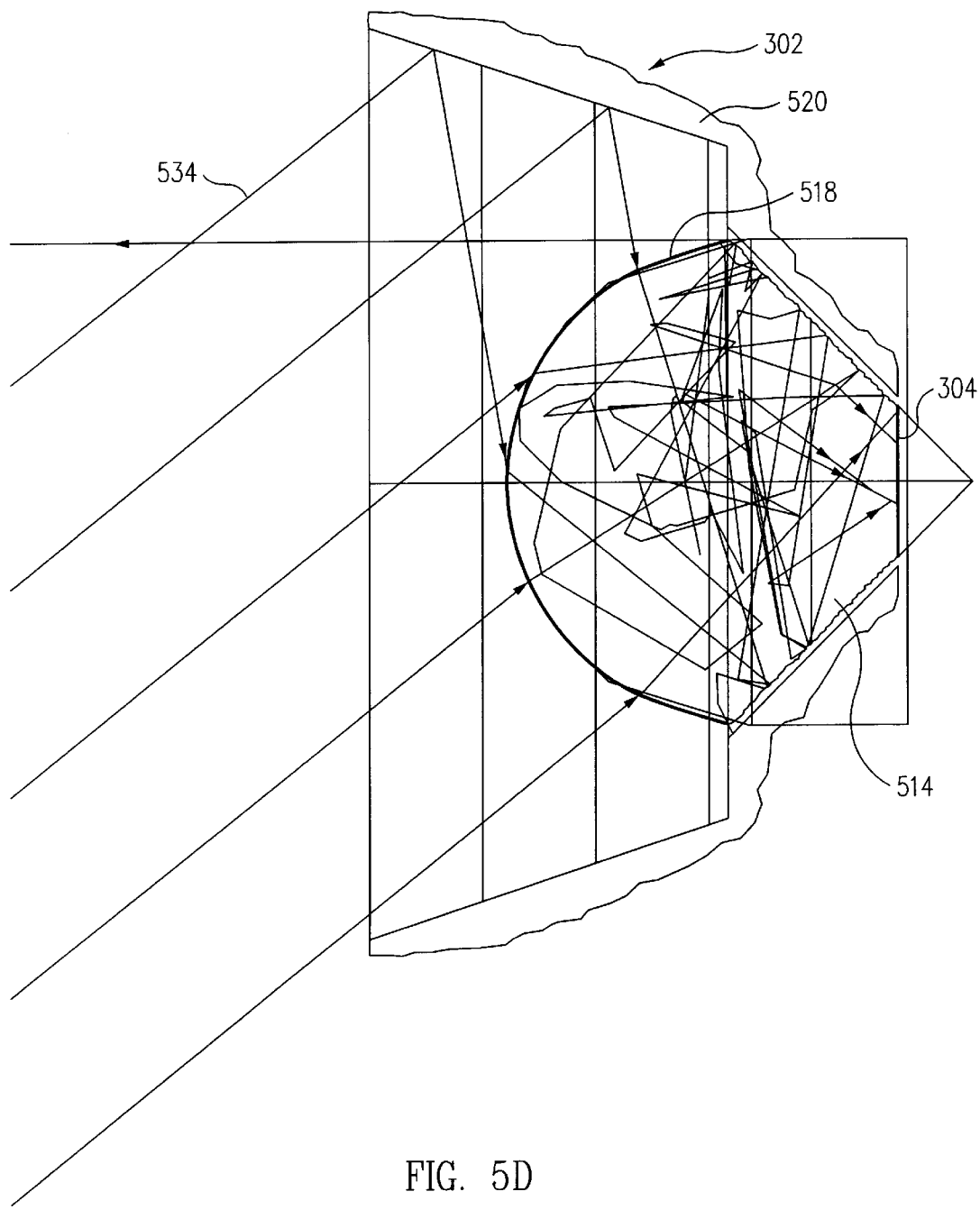

FIGS. 5B–5D are cross-sectional schematic diagrams illustrating the transmission and capture of IR radiation incident from various angles onto collecting lens assembly 302. FIG. 5B shows the case of radiation 530 incident normal to the plane of photodetector 304. This radiation is captured efficiently by wide-angle lens 518 alone. FIG. 5C shows the case of radiation 532 incident at a 30-degree angle from normal, which is efficiently captured by wide-angle lens 518 and inner light cone 514 cooperatively. FIG. 5D shows the case of radiation 534 incident at 40-degree angle from normal. In this situation, outer conic cavity 520 reflects radiation into wide-angle lens 518 that would otherwise be lost. This reclaimed radiation is then efficiently captured by wide-angle lens 518 and inner light cone 514 cooperatively.

Figure 5E:
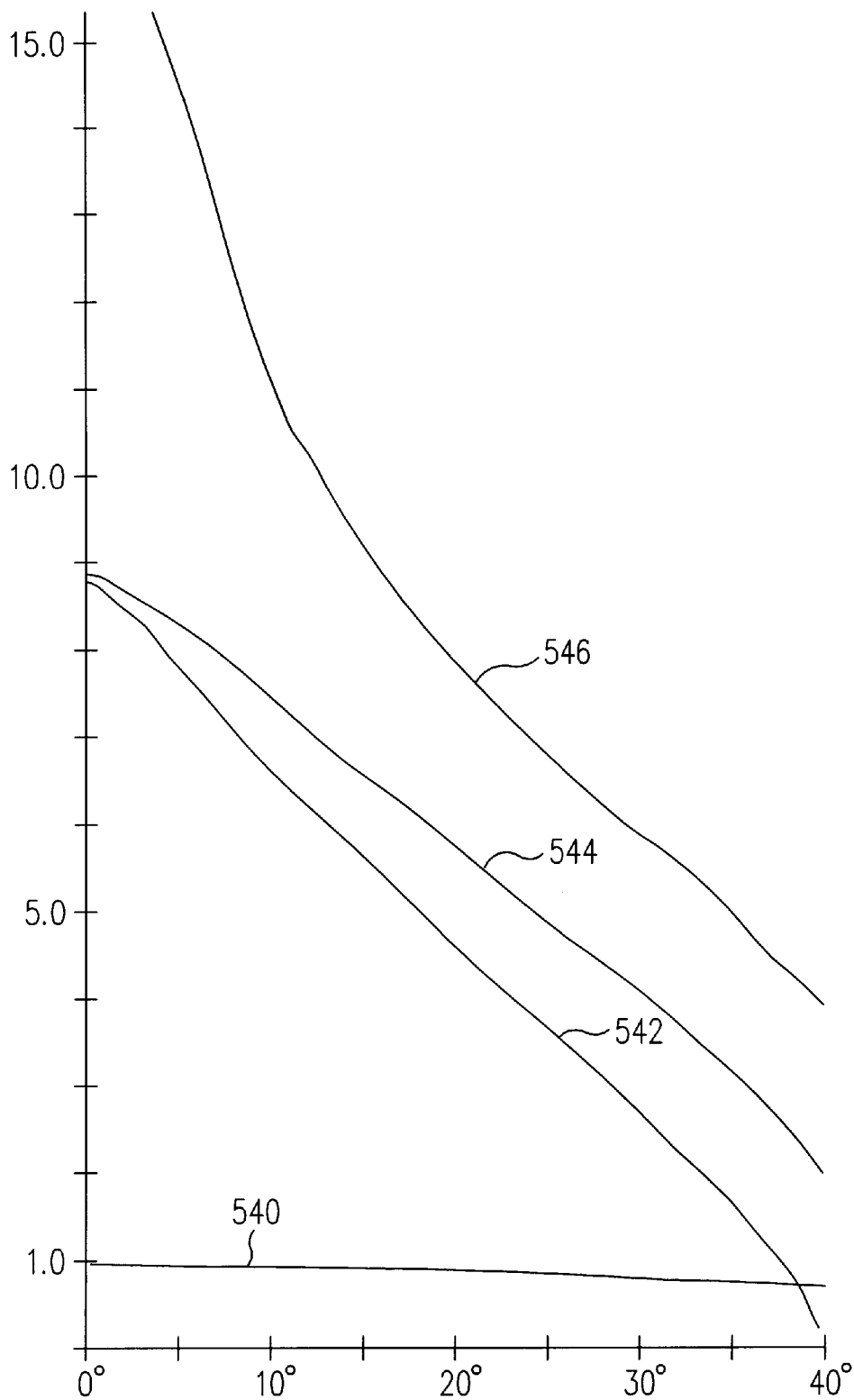
FIG. 5E is a graphic representation of the calculated radiative capture by various combinations of elements of the assembly of FIG. 5A, relative to the radiative capture by an unaided photodetector.

FIG. 5E is a graphic representation of the calculated radiative capture by various elements of collecting lens assembly 302, relative to the radiative capture by photodetector 304 absent the other elements of collecting lens assembly 302. Relative radiative capture is shown along the vertical axis, and off-axis angle of incidence relative to symmetry axis 512 is shown along the horizontal axis. The baseline radiative capture of identically 1.0 by unaided photodetector 304 is shown as curve 540. Curve 542 shows the combined relative radiative capture by photodetector 304 and wide-angle collecting lens 518. Curve 544 shows the combined relative radiative capture by photodetector 304, wide-angle collecting lens 518, and inner light cone 514. Curve 546 shows the combined relative radiative capture by entire collecting lens assembly 302, including photodetector 304, wide-angle collecting lens 518, inner light cone 514, and outer conic cavity 520. As shown in FIG. 5C, the radiative capture by complete collecting lens assembly 302 relative to unaided photodetector 304 exceeds a factor of 15 on-axis and approximates a factor of four at a 40-degree angle off-axis.

Referring to FIG. 1B, in an alternative embodiment, a tether 124 (shown dashed) is connected directly from base station 112 to remote electronic circuit 142 at headset 104, where it delivers the combined audio/visual signal. Tether 124 can contain either a single or dual optical fiber cable, such that a second optical fiber transmits return IR signal 120. Alternatively, tether 124 contains a bi-directional, electrically conducting coaxial cable. This configuration greatly simplifies IR video interface 100 by eliminating most components of transceiver module 110 and collecting lens assembly 302. The coaxial cable implementation additionally eliminates all optical and optoelectronic components. It also improves signal to noise performance at reduced power. However, the direct tether connection to headset 104 adversely restricts the freedom of motion of user 102.

Although a head-mounted display is described above, it will be understood by those having ordinary skill in the art that the principles, methods, and apparatus described herein can be applied as well to remote displays that are not head-mounted.

While embodiments of the present invention have been shown and described, changes and modifications to these illustrative embodiments can be made without departing from the present invention in its broader aspects. Thus it should be evident that there are other embodiments of this invention which, while not expressly described above, are within the scope of the present invention. Therefore, it will be understood that the appended claims necessarily encompass all such changes and modifications as fall within the described invention's true scope; and further that this scope is not limited merely to the illustrative embodiments presented to demonstrate that scope.

What is claimed is:

1. An apparatus including a video interface for a remote display, comprising:
   a video processing circuit configured to output a modulated video signal;
   a remote receiver configured to receive said modulated video signal; and
   a remote electronic circuit interconnected to said receiver and to a video display device, said remote electronic circuit configured to apply said modulated video signal to control and drive said video display device;
   said modulated video signal having a data structure comprising a repetitive sequence of frame times, each said frame time containing substantially equal consecutive field times for each of three color fields, a portion of each said field time containing a burst of pixel luminance and control data.

2. The apparatus of claim 1, further configured such that said modulated video signal is transmitted from said video processing circuit to said receiver at least in part on a modulated beam of electromagnetic energy.

3. The apparatus of claim 2, wherein said modulated beam of electromagnetic energy is an infrared beam having a wavelength in a range of approximately 700 nm to approximately 1100 nm.

4. The apparatus of claim 2, including an optical fiber connecting said video processing circuit to said receiver, said modulated beam of electromagnetic energy propagating through said optical fiber.

5. The apparatus of claim 2, further configured such that said modulated beam of electromagnetic energy propagates to said receiver at least in part through a free atmospheric path.

6. The apparatus of claim 5, configured such that said modulated beam of electromagnetic energy is diffusely reflected from a surface located proximate to said receiver.

7. The apparatus of claim 5, further comprising a shaping lens assembly located proximate to said receiver, said shaping lens assembly being configured to output said modulated beam of electromagnetic energy in a pattern, wherein said modulated beam of electromagnetic energy is substantially concentrated within a volume including the probable location of said receiver.

8. The apparatus of claim 7, wherein said shaping lens assembly comprises:
   a convergent output lens having a hollow conic input surface and a substantially hemispherical output surface; and
   a divergent input lens having a hollow conic input surface and a flat output surface;
   said input lens and said output lens being aligned and adjustably separated along a mutual conic axis; and
   said input and output lens being aspheric.

9. The apparatus of claim 7, wherein said input and output lens are made of an optically transmitting polymeric material.

10. The apparatus of claim 9, wherein said polymeric material is selected from the group consisting of polymethyl methacrylates and polycarbonates.

11. The apparatus of claim 7, wherein said shaping lens assembly comprises:

a cluster of infrared light emitting diodes; and an aspheric convergent output lens having a hollow conic input surface and a substantially hemispherical output surface;

said cluster of light emitting diodes and said convergent output lens being aligned and adjustably separated along a mutual axis.

12. The apparatus of claim 11, wherein said cluster of light emitting diodes is interconnected with said video processing circuit through a coaxial cable.

13. The apparatus of claim 5, wherein said receiver further comprises a collecting lens assembly incorporating:

a photodetector;

an inner light cone optically cemented to said photodetector, said inner light cone having diffusely reflecting outer walls; and a wide-angle collecting lens attached coaxially to said inner light cone.

14. The apparatus of claim 13, wherein said collecting lens assembly further comprises an outer conic cavity disposed coaxially around said wide angle collecting lens and inner light cone, said outer conic cavity having polished reflective inner walls.

15. The apparatus of claim 13, wherein said wide angle collecting lens is aspheric.

16. The apparatus of claim 13, wherein said wide angle collecting lens is made of an optically transmitting polymeric material.

17. The apparatus of claim 16, wherein said wide angle collecting lens and said inner light cone are an integrated monolithic structure.

18. The apparatus of claim 16, wherein said polymeric material is selected from the group consisting of polymethyl methacrylates and polycarbonates.

19. The apparatus of claim 1, further comprising a headset to be worn by a user, said headset incorporating said receiver and said video display device.

20. The apparatus of claim 1, further comprising a tether interconnecting said video processing circuit and said receiver, such that said modulated video signal is transmitted through said tether.

21. The apparatus of claim 20, wherein said tether includes an electrically conducting coaxial cable, such that said modulated video signal is transmitted through said coaxial cable.

22. The apparatus of claim 20, wherein said tether includes an optical fiber, such that said modulated video signal is transmitted through said optical fiber.

23. The apparatus of claim 1, wherein said remote electronic circuit is configured to illuminate said video display device sequentially with light from colored light emitting diodes in synchronism with said bursts of pixel luminance data, such that illumination occurs during a portion of each said field time not containing said burst.

24. The apparatus of claim 23, further configured to operate two separate video display devices alternately, such that data bursts of a first video signal for a first display device alternate with corresponding data bursts of a second video signal for a second display device, and wherein said first and second video signals are derived from a single time-duplexed video data stream.

25. The apparatus of claim 1, wherein said field time is in a range of approximately 4 msec to approximately 6 msec.

26. The apparatus of claim 1, further configured to provide a video bandwidth of the order of or greater than 100 MHz.

27. The apparatus of claim 1, wherein said video processing circuit is configured to convert a frame rate in an input video signal into a higher frame rate in said modulated video signal by repeated color fields.

28. The apparatus of claim 1, wherein said modulated video signal incorporates an embedded audio signal.

29. The apparatus of claim 1, further comprising a return audio link configured to propagate a return audio modulated signal from the proximity of said remote receiver to the proximity of said video processing circuit.

30. An apparatus including a video interface for a remote display, comprising:

a video processing circuit configured to output a modulated video signal;

a remote receiver; said receiver configured to receive said modulated video signal;

a remote electronic circuit interconnected between said receiver and a video display device, said remote electronic circuit configured to apply said modulated video signal to control and drive said video display device; and a shaping lens assembly located proximate to said receiver, said shaping lens assembly being configured to output said modulated video signal to said receiver at least in part through a free atmospheric path on a modulated beam of electromagnetic energy, such that said modulated beam of electromagnetic energy is concentrated substantially within a volume including the probable location of said receiver.

31. The apparatus of claim 30, wherein said modulated beam of electromagnetic energy is an infrared beam having a wavelength in a range of approximately 700 nm to approximately 1100 nm.

32. The apparatus of claim 30, wherein said shaping lens assembly comprises:

a convergent output lens having a hollow conic input surface and a substantially hemispherical output surface; and a divergent input lens having a hollow conic input surface and a flat output surface;

said input lens and said output lens being aligned and adjustably separated along their respective conic axes; and said input and output lens being aspheric.

33. The apparatus of claim 30, wherein said shaping lens assembly comprises:

a cluster of infrared light emitting diodes; and an aspheric convergent output lens having a hollow conic input surface and a substantially hemispherical output surface;

said cluster of light emitting diodes and said convergent output lens being aligned and adjustably separated along a mutual axis.

34. The apparatus of claim 33, wherein said cluster of light emitting diodes is interconnected with said video processing circuit through a coaxial cable.

35. The apparatus of claim 30, wherein said receiver further comprises a collecting lens assembly incorporating:

a photodetector;

an inner light cone optically cemented to said photodetector, said inner light cone having diffusely reflecting outer walls; and a wide-angle collecting lens attached coaxially to said inner light cone.

36. The apparatus of claim 35, wherein said collecting lens assembly further comprises an outer conic cavity disposed coaxially around said wide angle collecting lens and inner light cone, said outer conic cavity having polished reflective inner walls.

37. The apparatus of claim 35, wherein said wide angle collecting lens is aspheric.

38. The apparatus of claim 30, further comprising a headset to be worn by a user, said headset including said receiver and said video display device.

39. The apparatus of claim 30, wherein said modulated video signal incorporates an embedded audio signal.

40. The apparatus of claim 30, further comprising a return audio link configured to propagate an audio modulated signal from the proximity of said remote receiver to the proximity of said video processing circuit.

41. An apparatus including a shaping lens assembly configured for shaping a beam of electromagnetic radiation, said assembly comprising:
 a convergent output lens having a hollow conic input surface and a substantially hemispherical output surface; and
 a divergent input lens having a hollow conic input surface and a flat output surface;
 said input lens and said output lens being aligned and adjustably separated along a mutual axis.

42. The apparatus of claim 41, wherein said convergent output lens and said divergent input lens are made of an optically transmitting polymeric material.

43. The apparatus of claim 42, wherein said polymeric material is selected from the group consisting of polymethyl methacrylates and polycarbonates.

44. An apparatus including a collecting lens assembly comprising:
 an inner light cone having diffusely reflecting outer walls;
 a wide-angle collecting lens attached coaxially to said inner light cone; and
 an outer conic cavity disposed coaxially around said wide-angle collecting lens, said outer conic cavity having polished reflective inner walls.

45. The apparatus of claim 44, further comprising a headset configured to be worn by a user, said headset including said collecting lens assembly and a video display device.

46. The apparatus of claim 44, wherein said wide-angle collecting lens is made of an optically transmitting polymeric material.

47. The apparatus of claim 46, wherein said wide angle collecting lens and said inner light cone are an integrated monolithic structure.

48. The apparatus of claim 46, wherein said polymeric material is selected from the group consisting of polymethyl methacrylates and polycarbonates.

49. A method of operating a remote video display device, comprising:
 generating a modulated video signal;
 transmitting said modulated video signal to a remote receiver; and
 applying said modulated video signal to control and drive said video display device;
 said modulated video signal having a data structure comprising a repetitive sequence of frame times, each said frame time containing substantially equal consecutive field times for each of three color fields, a portion of each said field time containing a burst of pixel luminance and control data.

50. The method of claim 49, wherein said modulated video signal is transmitted on a modulated beam of electromagnetic energy.

51. The method of claim 50, wherein said modulated beam of electromagnetic energy is an infrared beam having a wavelength in a range of approximately 700 nm to approximately 1100 nm.

52. The method of claim 50, wherein said modulated beam of electromagnetic energy is transmitted through an optical fiber to said receiver.

53. The method of claim 50, wherein said modulated beam of electromagnetic energy is transmitted to said receiver at least in part through a free atmospheric path.

54. The method of claim 53, wherein said modulated beam of electromagnetic energy is diffusely reflected from a surface located above and proximate to said receiver.

55. The method of claim 53, further comprising shaping and outputting said modulated beam of electromagnetic energy prior to said transmitting, using a shaping lens assembly located proximate to said receiver, thereby concentrating said modulated beam of electromagnetic energy within a volume including the probable location of said receiver.

56. The method of claim 55, wherein said shaping is performed using a shaping lens assembly comprising:
 a convergent output lens having a hollow conic input surface and a substantially hemispherical output surface; and
 a divergent input lens having a hollow conic input surface and a flat output surface;
 said input lens and said output lens being aligned and adjustably separated along a mutual axis; and
 said input and output lens being aspheric.

57. The method of claim 55, wherein said shaping is performed using a shaping lens assembly comprising:
 a cluster of infrared light emitting diodes; and
 an aspheric convergent output lens having a hollow conic input surface and a substantially hemispherical output surface;
 said cluster of light emitting diodes and said convergent output lens being aligned and adjustably separated along a mutual axis.

58. The method of claim 57, wherein said cluster of light emitting diodes is interconnected with said video processing circuit through a coaxial cable.

59. The method of claim 53, wherein said receiver comprises a collecting lens assembly incorporating:
 a photodetector;
 an inner light cone optically cemented to said photodetector, said inner light cone having diffusely reflecting outer walls; and
 a wide-angle collecting lens attached coaxially to said inner light cone.

60. The method of claim 59, wherein said collecting lens assembly further comprises an outer conic cavity disposed coaxially around said wide angle collecting lens and inner light cone, said outer conic cavity having polished reflective inner walls.

61. The method of claim 59, wherein said wide angle collecting lens is aspheric.

62. The method of claim 49, wherein said receiver and said video display device are incorporated in a headset worn by a user.

63. The method of claim 49, further comprising illuminating said video display device sequentially with light from colored light emitting diodes in synchronism with said bursts of pixel luminance data, such that said illuminating occurs during a portion of each said field time not containing said data burst.

64. The method of claim 63, wherein two separate video display devices are operated alternately, such that data bursts of a first video signal for a first display device alternate with corresponding data bursts of a second video signal for a second display device, and wherein said first and second video signals are derived from a single time-duplexed video data stream.

65. The method of claim 49, further comprising converting a frame rate in an input video signal to a higher frame rate in said modulated video signal by repeating selected color fields.

66. The method of claim 49, further comprising embedding an audio signal into said modulated video signal.

67. The method of claim 49, further comprising transmitting a return audio modulated signal from the proximity of said remote receiver.

68. A method of operating a remote video display device, comprising:
generating a modulated video signal;
transmitting said modulated video signal on a modulated beam of electromagnetic energy through a free atmospheric path to a remote receiver; and
applying said modulated video signal to control and drive said video display device; and
shaping said modulated beam of electromagnetic energy, thereby concentrating said modulated beam of electromagnetic energy within a volume including the probable location of said receiver.

69. The method of claim 68, wherein said modulated beam of electromagnetic energy is an infrared beam having a wavelength in a range of approximately 700 nm to approximately 1100 nm.

70. The method of claim 68, wherein said shaping is performed using a shaping lens assembly, comprising:
a convergent output lens having a hollow conic input surface and a substantially hemispherical output surface; and a divergent input lens having a hollow conic input surface and a flat output surface;
said input lens and said output lens being aligned and adjustably separated along a mutual axis; and
said input and output lens being aspheric.

71. The method of claim 68, wherein said shaping is performed using a shaping lens assembly, comprising:
a cluster of infrared light emitting diodes; and
an aspheric convergent output lens having a hollow conic input surface and a substantially hemispherical output surface;
said cluster of light emitting diodes and said convergent output lens being aligned and adjustably separated along a mutual axis.

72. The method of claim 71, wherein said cluster of light emitting diodes is interconnected with said video processing circuit through a coaxial cable.

73. The method of claim 68, wherein said receiver comprises a collecting lens assembly incorporating:
a photodetector;
an inner light cone optically cemented to said photodetector, said inner light cone having diffusely reflecting outer walls; and
a wide-angle collecting lens attached coaxially to said inner light cone.

74. The method of claim 73, wherein said collecting lens assembly further comprises an outer conic cavity disposed coaxially around said wide angle collecting lens and inner light cone, said outer conic cavity having polished reflective inner walls.

75. The method of claim 73, wherein said wide angle collecting lens is aspheric.

76. The method of claim 68, wherein said receiver and said video display device are incorporated in a headset worn by a user.

77. The method of claim 68, further comprising embedding an audio signal in said modulated video signal.

78. The method of claim 68, further comprising transmitting a return audio modulated signal from the proximity of said remote receiver.

* * * * *